United States Patent
Uejo et al.

(10) Patent No.: US 7,646,500 B2
(45) Date of Patent: Jan. 12, 2010

(54) IMAGE FORMATION ASSISTING DEVICE, IMAGE FORMATION ASSISTING METHOD, AND IMAGE FORMATION ASSISTING SYSTEM

(75) Inventors: Hiroyoshi Uejo, Ebina (JP); Toshikazu Kitagawa, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1042 days.

(21) Appl. No.: 10/965,873

(22) Filed: Oct. 18, 2004

(65) Prior Publication Data

US 2005/0206915 A1 Sep. 22, 2005

(30) Foreign Application Priority Data

| Mar. 16, 2004 | (JP) | ............................. 2004-074617 |
| Mar. 16, 2004 | (JP) | ............................. 2004-074618 |
| Mar. 16, 2004 | (JP) | ............................. 2004-074619 |

(51) Int. Cl.
*G06F 3/12* (2006.01)
*G06K 1/00* (2006.01)
*G06K 15/00* (2006.01)
*H04N 1/46* (2006.01)

(52) U.S. Cl. ........................ 358/1.15; 358/1.1; 358/1.9; 358/1.12; 358/1.16; 358/501

(58) Field of Classification Search .................. 358/1.1, 358/1.2, 1.9, 1.15, 1.16, 501, 1.12; 715/204
See application file for complete search history.

(56) References Cited

U.S. PATENT DOCUMENTS

2003/0048467 A1* 3/2003 Okamoto et al. ........... 358/1.12

FOREIGN PATENT DOCUMENTS

| JP | A-10-186948 | 7/1998 |
| JP | A 2001-285609 | 10/2001 |
| JP | A 2002-215380 | 8/2002 |
| JP | A-2002-222184 | 8/2002 |
| JP | A 2002-287934 | 10/2002 |
| JP | A 2003-307971 | 10/2003 |

* cited by examiner

*Primary Examiner*—Edward L Coles
*Assistant Examiner*—Thomas J Lett
(74) *Attorney, Agent, or Firm*—Oliff & Berridge, PLC

(57) ABSTRACT

An image formation assisting device calculates layout information such as allocation and pasting position of each page by a BEP from a file size with reference to the orientation tag of image file data in a TIFF produced by an RIP and cuts image data electronically according to the result of the calculation and makes the upper portion and lower portion of each page correspond with those of the other papers and rearranges each electronically cut page according to an instruction of collation or face-down, when the instruction is provided, and activates a print engine to start and specifies predetermined paper automatically and outputs the image data to the print engine. As a result, there is provided an image formation assisting device capable of using image data for CTP for on-demand printing.

21 Claims, 13 Drawing Sheets

FEP: FRONT END PROCESSOR  Y: YELLOW    P@ - @: NUMBER OF PAGE
BEP: BACK END PROCESSOR    C: CYAN      T: TOP
                           M: MAGENTA   B: BOTTOM
                           K: BLACK

| OUTPUT MODE ORDERED BY CLIENT | PROCESSING OF FEP SIDE (RI PROCESSING + CONTRACTION PROCESSING) | PROCESSING OF BEP |
|---|---|---|
| DOUBLE-SIDED PRINTING | P1T→P1B→P2T →P2B→P3T→P3B →・・・→ | CHANGE THE ORDER OF PROCESSING OF PAGE P1T→P2T→P3T→P4T→P5T →P1B→P6T→P2B→P7T→P3B→・・・ |
| SINGLE-SIDED PRINTING | P1(YMCK)→P2(YMCK) →P3(YMCK) | CHANGE THE ORDER OF PROCESSING OF PAGE (IN CORRESPONDENCE WITH FOUR-CYCLE ENGINE) P1Y→P1M→P1C→P1K→P2Y→P2M→ P2C→P2K→P3Y→P3M→P3C→P3K→ |
| DOUBLE-SIDED PRINTING | P1YMCKT→P1YMCKTB→ P2YMCKT→P2YMCKTB | CHANGE THE ORDER OF PROCESSING OF PAGE (IN CORRESPONDENCE WITH FOUR-CYCLE ENGINE) P1YT→P1MT→P1CT→P1KT→P2YT→ P2MT→P1YB→P2YT→P1MB→P2KT・・・ |
| COLLATION FACE UP FACE DOWN | P1(YMCK)→P2(YMCK) →P3(YMCK) | CHANGE THE ORDER OF PROCESSING OF PAGE → FROM THE LAST PAGE OF JOB → FROM THE FIRST PAGE OF JOB |
| INSTRUCTION RELATED TO BINDING POSITION (FINISHER) | P1(YMCK)→P2(YMCK) →P3(YMCK) | SHIFT IMAGE ON PAPER ROTATE IMAGE SHIFT IMAGE IN VERTICAL DIRECTION OR IN LATERAL DIRECTION |

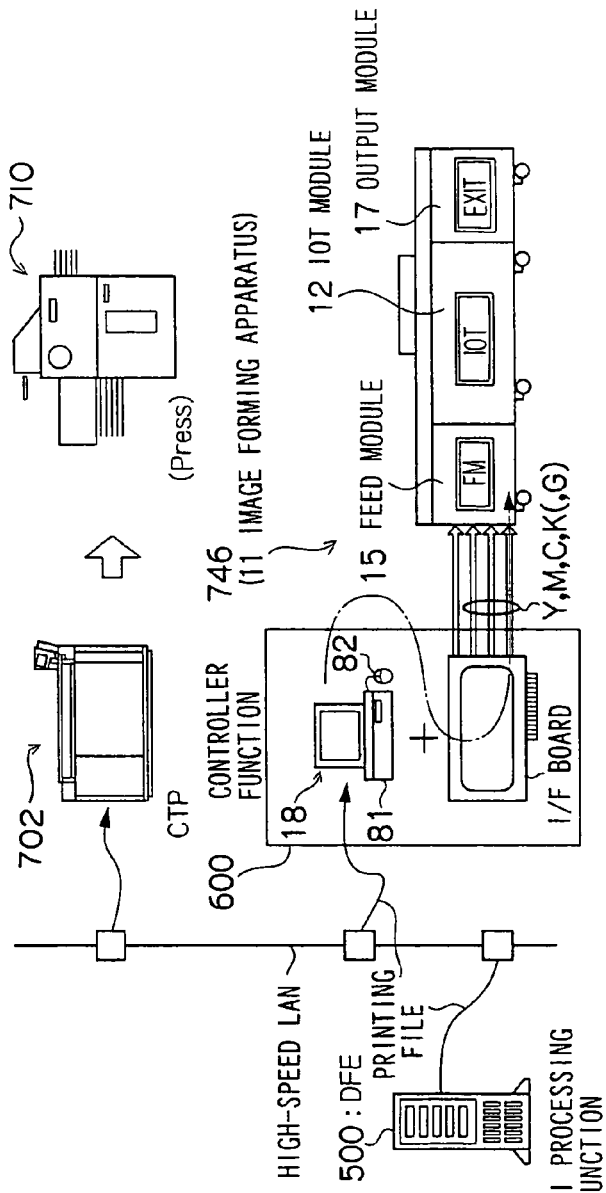
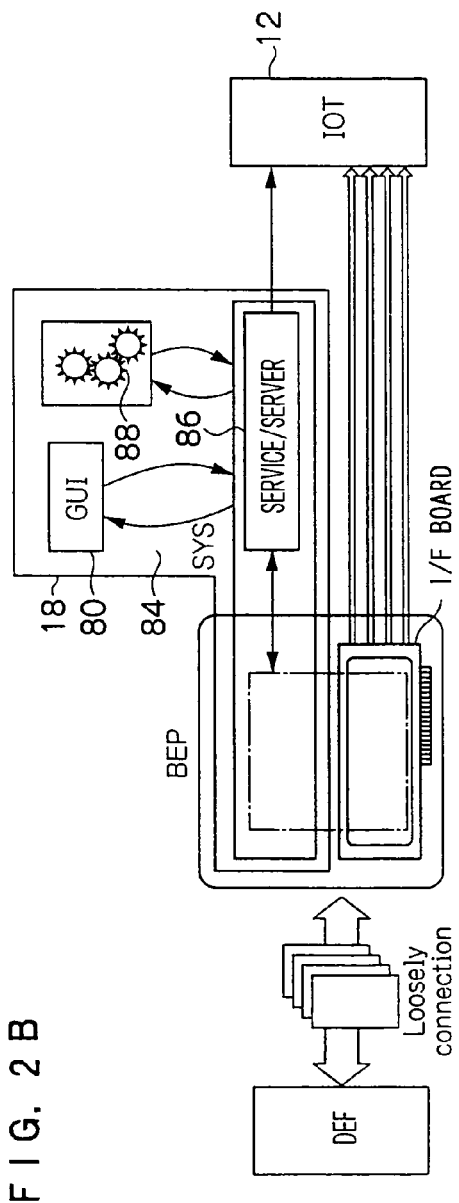
F I G. 2 A
F I G. 2 B

FIG. 4A

FEP: FRONT END PROCESSOR  
BEP: BACK END PROCESSOR

Y: YELLOW  
C: CYAN  
M: MAGENTA  
K: BLACK

P@-@: NUMBER OF PAGE  
T: TOP  
B: BOTTOM

| OUTPUT MODE ORDERED BY CLIENT | PROCESSING OF FEP SIDE (RI PROCESSING + CONTRACTION PROCESSING) | PROCESSING OF BEP |
|---|---|---|
| DOUBLE-SIDED PRINTING | P1T→P1B→P2T →P2B→P3T→P3B →···→ | CHANGE THE ORDER OF PROCESSING OF PAGE<br><br>P1T→P2T→P3T→P4T→P5T →P1B→P6T→P2B→P7T→P3B→··· |
| SINGLE-SIDED PRINTING | P1(YMCK)→P2(YMCK) →P3(YMCK) | CHANGE THE ORDER OF PROCESSING OF PAGE (IN CORRESPONDENCE WITH FOUR-CYCLE ENGINE)<br><br>P1Y→P1M→P1C→P1K→P2Y→P2M→ P2C→P2K→P3Y→P3M→P3C→P3K→ |
| DOUBLE-SIDED PRINTING | P1YMCKT→P1YMCKTB→ P2YMCKT→P2YMCKTB | CHANGE THE ORDER OF PROCESSING OF PAGE (IN CORRESPONDENCE WITH FOUR-CYCLE ENGINE)<br><br>P1YT→P1MT→P1CT→P1KT→P2YT→ P2MT→P1YB→P2YT→P1MB→P2KT··· |
| COLLATION<br>FACE UP<br>FACE DOWN | P1(YMCK)→P2(YMCK) →P3(YMCK) | CHANGE THE ORDER OF PROCESSING OF PAGE<br>FROM THE LAST PAGE OF JOB<br>FROM THE FIRST PAGE OF JOB |
| INSTRUCTION RELATED TO BINDING POSITION (FINISHER) | P1(YMCK)→P2(YMCK) →P3(YMCK) | SHIFT IMAGE ON PAPER<br>ROTATE IMAGE<br>SHIFT IMAGE IN VERTICAL DIRECTION OR IN LATERAL DIRECTION |

FIG. 4B

| STATE OF OUTPUT SIDE | PROCESSING OF BEP SIDE |
|---|---|
| PAPER GETS JAMMED/ELECTRIC POWER IS TURNED OFF | PERFORM RECOVERY PROCESSING SEND IMAGE OF UNPROCESSED PAGE |

FIG. 9
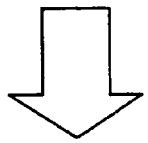
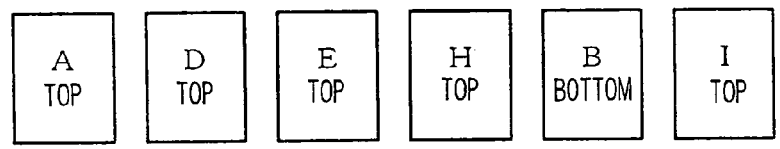
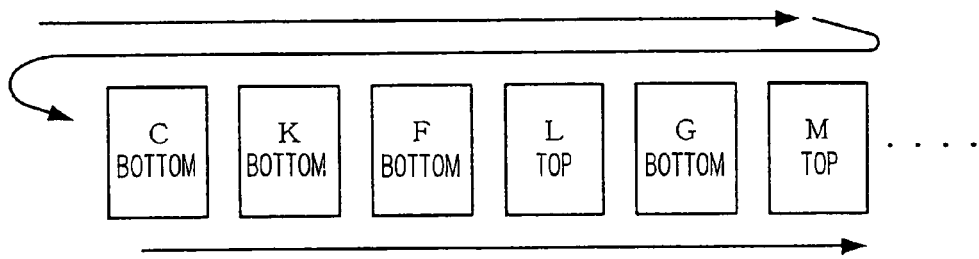
SORT IMAGE DATA IN CONSIDERATION OF DOUBLE-SIDED SEQUENCE BY BEP PROCESSOR

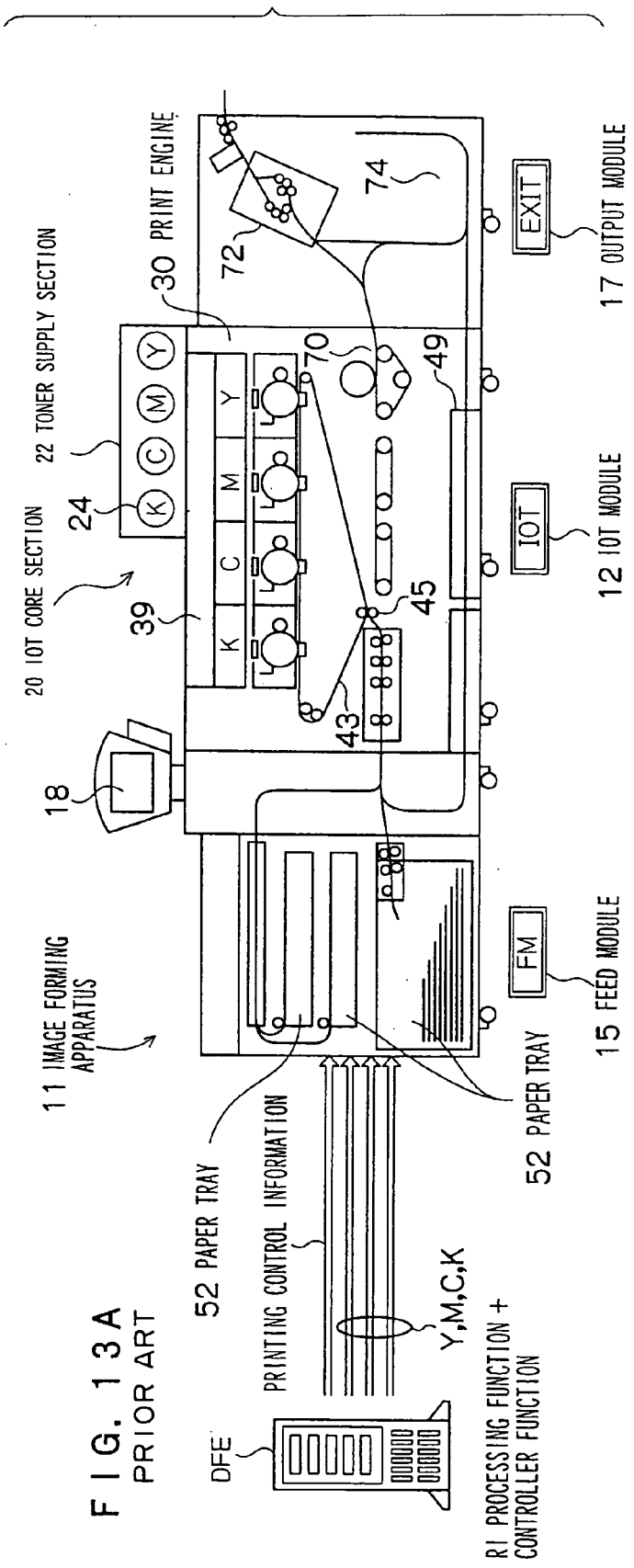
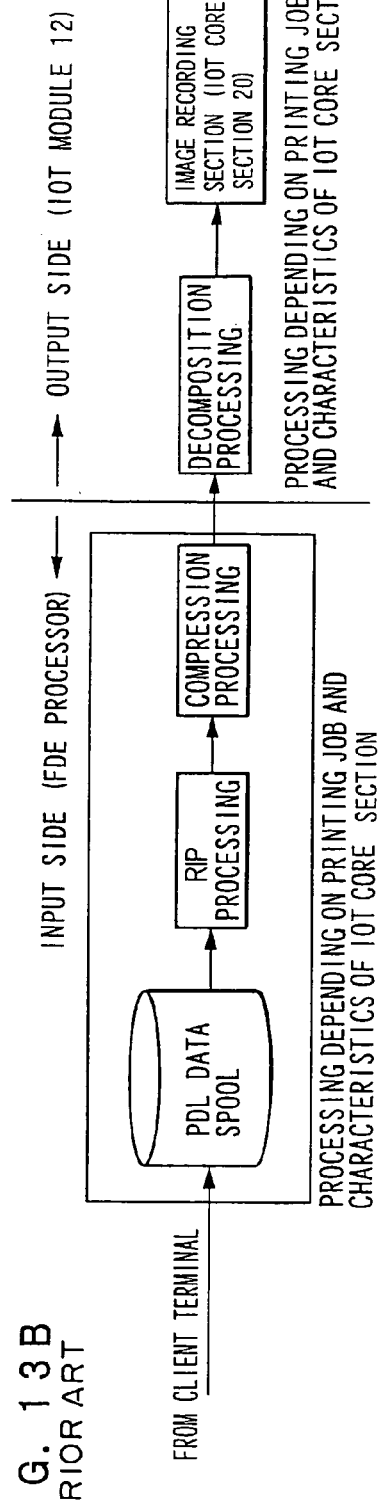
FIG. 13A PRIOR ART
FIG. 13B PRIOR ART

IMAGE FORMATION ASSISTING DEVICE, IMAGE FORMATION ASSISTING METHOD, AND IMAGE FORMATION ASSISTING SYSTEM

CROSS-REFERENCE TO RELATED APPLICATION

This application claims priority under 35 USC 119 from Japanese Patent Application Nos. 2004-74617, 2004-74618, and 2004-74619, the disclosures of which are incorporated by reference herein.

BACKGROUND OF THE INVENTION

1. Field of the Invention

The present invention relates to an image formation assisting device, an image formation assisting method, and an image formation assisting system, and, for example, to an image formation assisting device, an image formation assisting method, and an image formation assisting system for outputting data to an image forming apparatus having a so-called printing function of forming an image on a recording medium, such as a color copier, a facsimile, a printer, or the like.

2. Description of the Related Art

In conventional printing (for example, offset printing), intermediate products, for example, paper prints (photographic paper) such as photo compositions, layout paper, negative halftones, positive halftones, and PS plates (press plates) are produced, and printing and bookbinding are performed by using these intermediate products. In recent years, DTP (Desktop Publishing/Prepress) has come into widespread use and "direct printing" or "on-demand printing" of printing matter directly from DTP data has been known. In the DTP, a processing including steps of: processing a page layout on a computer to produce printing data; forming the printing data on photographic paper, a platemaking film, or the like; producing a press plate on the basis of the photographic paper or the platemaking film; and printing the press plate on the printing paper, has become widespread. Further, a CTP (Computer To Plate) process for forming a press plate directly by using electronic data without producing the intermediate products is also receiving attention. An image forming apparatus having a printing function such as a printer or copier has been known as an apparatus to be used for a printing processing like this. Image forming apparatuses of recent years have improved image quality and are capable of color printing and, for example, a color printer apparatus using an electronic photographic process (xerography) can form images of high quality at high speeds. This image forming apparatus can receive printing data and output printed matter without producing a press plate or the like.

FIGS. 13A and 13B are structural views of an image forming system in the related art. As can be seen from a general structural view shown in FIG. 13A, the image forming system is constructed of an image forming apparatus 11 and a DFE (Digital Front End) processor that supplies the image forming apparatus 11 with printing data and instructs it to print the data. Further, FIG. 13B shows the flow of data.

The DFE processor has a drawing function and a printer controller (printing control device) function and, for example, receives printing data described in a page description language (PDL) in succession from a client terminal, converts this printing data into a raster image (RIP: raster image processing), further sends image data subjected to the RIP and printing control information (job ticket) such as the number of sheets to be printed and paper size to the image forming apparatus 11, controls the print engine and the paper feed system of the image forming apparatus 11, and makes the image forming apparatus 11 perform a printing processing. That is, the printing action of the image forming apparatus 11 is controlled by the printer controller of the DFE processor. As for the printing data, four colors (Y, M, C, K) including a combination of three colors of yellow (Y), magenta (M), and cyan (C), which are basic colors for color printing, and black (K) are sent to the image forming apparatus 11.

The image forming apparatus 11 records images on printing paper by using an electrophotographic process and includes an IOT (Image Output Terminal) module 12, a feed module (FM: paper feed module) 5 connected to the IOT module 12, an output module 17, and a user interface unit 18 that includes a touch panel and the like and supports the inputting of various kinds of data. The IOT module 12 has a toner supply section 22 mounted with a toner cartridge 24 for the colors of YMCK and an IOT core section 20. The IOT core section 20 is organized into a so-called tandem configuration in which print engines (printing units) 30, each having an optical scanning unit and a photoconductive drum and the like, are arranged for respective colors and in a line in the direction in which a belt is rotated and is provided with an electric control system storage section 39 for storing an electric circuit for controlling the print engines 30 and the like. In the IOT core section 20, a toner image on the photoconductive drum is transferred to an intermediate transfer belt 43 (primary transfer), and then the toner image is again transferred to printing paper (secondary transfer), whereby the toner images of respective colors of YMCK are transferred to the intermediate transfer belt 43 in a superimposed manner. The image (toner image) transferred to the intermediate transfer belt 43 is transferred to the printing paper fed from the feed module 15 at a predetermined timing and is fused and fixed to the printing paper by a fuser 70. Thereafter, the paper is delivered to the outside of the apparatus 11 via a paper delivery unit 72. Further, at the time of double-sided printing, printing paper printed on one side is temporarily stored in a paper delivery tray (stacker) 74, then pulled out of the paper delivery tray 74, turned over by a turn-over transport path 49, and then again fed to the IOT core section 20.

In this system, to realize a request for increasing the performance and the speed of an image forming processing (printing processing) (for example, color printing at 100 to 200 sheets/min or more), it is also necessary to increase the performance and the speed of the RIP and the printer controller of a printing control section for an image recording section at an output side.

However, the DFE processor performs not only the RIP for the PDL data from the client terminal but also additional processings, such as page rearrangement according to a printing job (rearrangement of ascending order/descending order, determination of order of pages to be processed at the time of double-sided printing, position shifting in accordance with a finisher, and the like), data conversion in accordance with the processing characteristics at the output side such as those of the print engine and the fuser (for example, correction of gray balance and out-of-register colors), and the like. For this reason, a single-purpose and independent device configuration has been adopted in which the DFE processor and the image forming apparatus 11 are connected to each other by a specially designed communications protocol.

In contrast to this, in the CTP method, the RIP described above is performed by the DFE processor. At this time, since a large-size press plate of about 1 m is usually used in the CTP method, the allocation of images on a page is performed to produce image data including a plurality of images allocated on a page. Then, a press plate is formed by using the image data and is printed on the sheets of paper, and then a post-processing such as cutting and the like is performed.

The image data obtained by performing the RIP for such a CTP method is a large size of about 1 m, whereas the maximum size of image data of the above-described image forming system such as on-demand printing is about 19 inches. Hence, at the present time, the image data for the CTP method can not be used in conjunction with the image data for the on-demand printing.

SUMMARY OF THE INVENTION

The present invention has been made in view of the above circumstances and provides an image formation assisting device, an image formation assisting method, and an image formation assisting system that can use image data for CTP method for on-demand printing.

An image formation assisting device, an image formation assisting method, and an image formation assisting system of the invention have a function of detecting allocation information related to the allocation of image data of a large size and of editing the image data of a large size electronically on the basis of the detected allocation information at the time of processing the image data according to an image forming apparatus for outputting the image data and transferring the processed image data to the image forming apparatus, whereby the image data produced for CTP method can be used for on-demand printing.

In more detail, a first aspect of the invention is to provide an image formation assisting device that processes a printing job to produce image data of respective pages, processes the image data according to an image forming apparatus at an output side, and transfers the processed image data to the image forming apparatus, the device comprising: an image storage section for receiving and storing the image data of a large size that is processed independently of a processing characteristic of the image forming apparatus and is allocated for a press plate; an output mode information acquisition section for receiving information related to an output mode desired by a client; a detection section for detecting allocation information related to an allocation position on the basis of the information related to the output mode acquired by the output mode information acquisition section; and an image processing section for electronically editing the image data of a large size so as to be divided into appropriate sizes on the basis of the allocation information detected by the detection section.

In addition, a second aspect of the invention is to provide an image formation assisting method of processing a printing job to produce image data of respective pages, processing the image data according to an image forming apparatus at an output side, and transferring the processed image data to the image forming apparatus, the method comprising: receiving and storing the image data of a large size that is processed independently of a processing characteristic of the image forming apparatus and is allocated for a press plate; receiving information related to an output mode desired by a client; detecting allocation information related to an allocation position on the basis of the information related to the output mode acquired at the received output mode; and electronically editing the image data of a large size so as to be divided into appropriate sizes on the basis of the detected allocation information.

In addition, in order to address the above problems, the present invention also provides an image formation assisting device, an image formation assisting method, and an image formation assisting system that can use image data for CTP method also for on-demand printing in consideration of recording image data on the top (front) and the bottom (back) of printing paper.

An image formation assisting device, an image formation assisting method, and an image formation assisting system of the invention have a function of detecting allocation information related to the allocation position of image data of a large size and of editing/dividing the image data of a large size electronically on the basis of the detected allocation information at the time of processing the image data according to an image forming apparatus at an output side and of transferring the image data to the image forming apparatus, and a function of determining whether or not the image data is to be recorded on the top and bottom of printing paper and of rearranging the electronically edited/divided image data on the basis of the result of determination and the processing characteristics of the image forming apparatus, whereby the image data produced for a CTP method can also be used for on-demand printing in consideration of recording the image data on the top and bottom of printing paper.

In more detail, a third aspect of the invention is to provide an image formation assisting device that processes a printing job to produce image data of respective pages, processes the image data according to an image forming apparatus at an output side, and transfers the processed image data to the image forming apparatus, the device comprising: an image storage section for receiving and storing the image data of a large size that is processed independently of a processing characteristic of the image forming apparatus and is allocated for a press plate; an output mode information acquisition section for receiving information related to an output mode desired by a client; a detection section for detecting allocation information related to an allocation position on the basis of the information related to the output mode acquired by the output mode information acquisition section; an image processing section for electronically editing the image data of a large size so as to be divided into appropriate sizes on the basis of the allocation information detected by the detection section; a determination section for determining whether or not the image data is to be used for double-sided recording, on the basis of information related to the output mode acquired by the output mode information acquisition section; a processing characteristic acquisition section for acquiring a processing characteristic of the image forming apparatus; and a collation section for rearranging the image data, electronically edited by the image processing section, on the basis of a determination result of the determination section and the processing characteristic of the image forming apparatus acquired by the processing characteristic acquisition section.

In addition, a fourth aspect of the invention is to provide an image formation assisting method of processing a printing job to produce image data of respective pages, processing the image data according to an image forming apparatus at an output side, and transferring the processed image data to the image forming apparatus, the method comprising: receiving and storing the image data of a large size that is processed independently of a processing characteristic of the image forming apparatus and is allocated for a press plate; receiving information related to an output mode desired by a client; detecting allocation information related to an allocation position on the basis of the information related to the received output mode; electronically editing the image data of a large size so as to be divided into appropriate sizes on the basis of the detected allocation information; determining whether or not the image data is to be used for double-sided recording, on the basis of information related to the received output mode; acquiring a processing characteristic of the image forming apparatus; and rearranging the edited image data, on the basis of a determination result of the determining and the acquired processing characteristic of the image forming apparatus.

Still further, in order to address the above problem, the invention also provide an image formation assisting device, an image formation assisting method, and an image formation assisting system that can allot image data produced for the CTP method to the CTP method and to the on-demand printing.

An image formation assisting device, an image formation assisting method, and an image formation assisting system of the invention have a function of detecting allocation information related to the allocation of image data of a large size and of editing/dividing the image data of a large size electronically on the basis of the detected allocation information at the time of processing the image data according to an image forming apparatus at an output side and a function of selecting image data to be reallocated for a press plate from the image information related to the image data and of transferring the selected image data to a device that reallocates the selected image to produce a press plate, whereby the image data produced for a CTP method can be allocated to the CTP method and to the on-demand printing.

In more detail, a fifth aspect of the invention is to provide an image formation assisting device that processes a printing job to produce image data of respective pages, processes the image data according to an image forming apparatus at an output side, and transfers the processed image data to the image forming apparatus, the device comprising: an image storage section for receiving and storing the image data of a large size that is processed independently of a processing characteristic of the image forming apparatus and is allocated for a press plate; an output mode information acquisition section for receiving mode information related to an output mode desired by a client and image information related to the image data; a detection section for detecting allocation information related to an allocation position on the basis of the mode information acquired by the output mode information acquisition section; an image processing section for electronically editing the image data of a large size so as to be divided into appropriate sizes on the basis of the allocation information detected by the detection section; and a selection section that selects image data to be reallocated for a press plate from among the image data electronically edited by the image processing section, on the basis of the image information acquired by the output mode information acquisition section, and transfers the selected image data to a device that reallocates the selected image data to produce a press plate.

In addition, a sixth aspect of the invention is to provide an image formation assisting method of processing a printing job to produce image data of respective pages, processing the image data according to an image forming apparatus at an output side, and transferring the processed image data to the image forming apparatus, the method comprising: receiving and storing the image data of a large size that is processed independently of a processing characteristic of the image forming apparatus and is allocated for a press plate; receiving mode information related to an output mode desired by a client and image information related to the image data; detecting allocation information related to an allocation position on the basis of the received mode information; electronically editing the image data of a large size so as to be divided into appropriate sizes on the basis of the detected allocation information; and selecting image data to be reallocated for a press plate from among the respective electronically edited image data on the basis of the image information and transferring the selected image data to a device that reallocates the selected image data to produce a press plate. It is also recommended that the invention includes an image formation assisting system including the above-described image formation assisting device and an image producing device that processes a printing job to produce image data of each page and outputs the image data to the image formation assisting device.

BRIEF DESCRIPTION OF THE DRAWINGS

Embodiments of the present invention will be described in detail based on the following figures, wherein:

FIGS. 2A and 2B are illustrations to show one embodiment of an image forming system.

FIGS. 4A and 4B are illustrations to describe a system usage mode in accordance with the above embodiment.

FIG. 9 is a schematic illustration to show another example of sorting of an image in consideration of top and bottom recording, performed by the BEP.

FIGS. 13A and 13B are illustrations to show the general configuration of an image forming system in a conventional image forming system.

DETAILED DESCRIPTION OF THE PREFERRED EMBODIMENTS

Embodiment 1

One example of the an embodiment of the present invention will be described in detail with reference to the drawings.

[Image Forming System]

Figure 1:
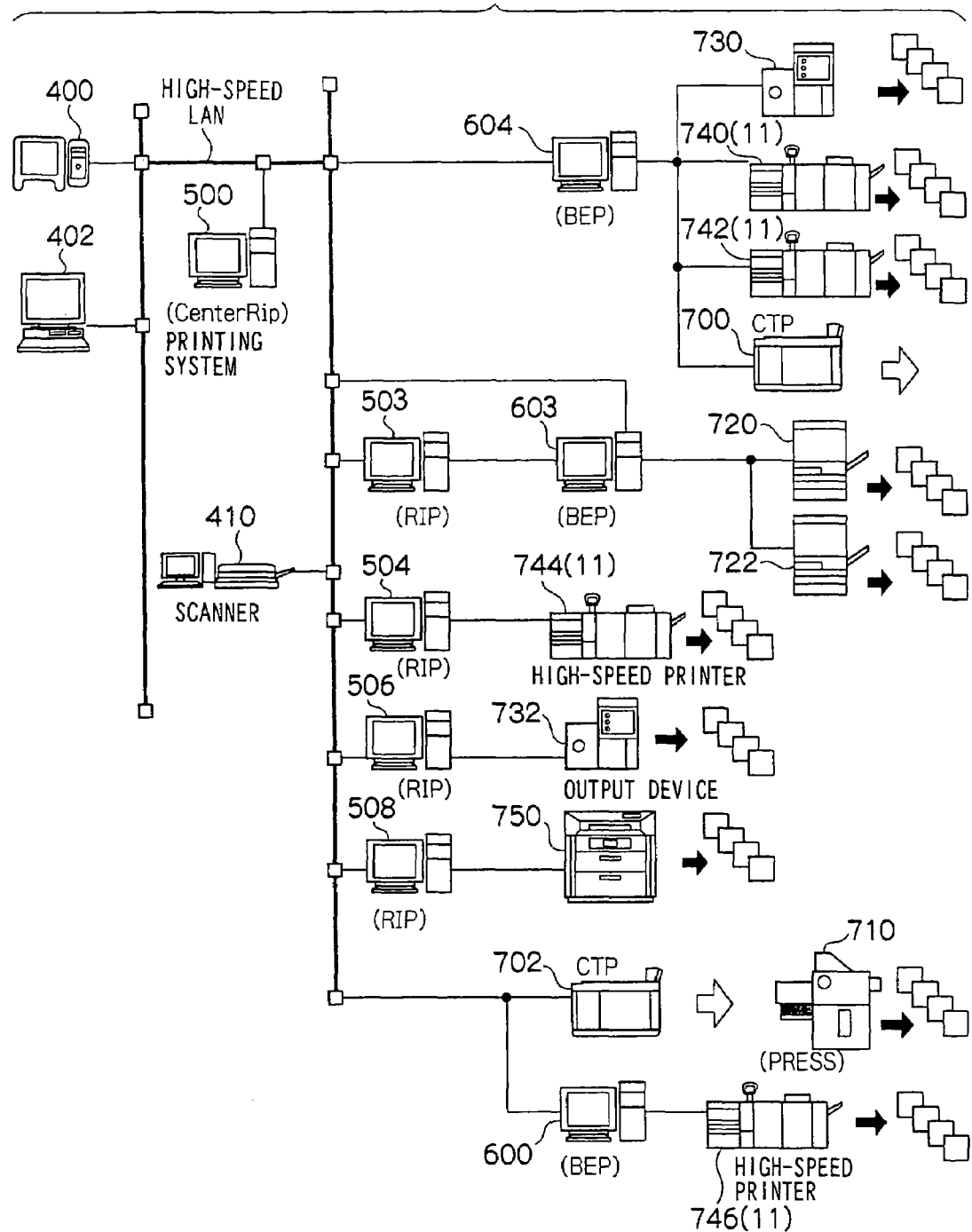
FIG. 1 is a schematic connection diagram illustrating the general configuration of an image forming system in accordance with an embodiment of the present invention.

FIG. 1 is an illustration to show the general configuration of an image forming system in accordance as a result embodiment. The image forming system has a high-speed LAN (Local Area Network) using a general-purpose communications protocol and client terminals 400 and 402 for inputting electronic data (printing data) described in, for example, a page description language (PDL) are connected to the high-speed LAN. The client terminals 400 and 402 are computers capable of executing various kinds of application programs under different operating systems (OS). A scanner 410, which reads an image on an original document and outputs the data of the image, is also connected to the high-speed LAN. Further, DFE processors 500, 503, 504, 506, and 508, BEPs (back end processor) 600, 603, and 604 as an image formation assisting device of the invention, which will be described below in detail, and a CTP device 702 for making a press plate directly by using electronic data are also connected to the high-speed LAN.

A press device 710 performs printing by using a press plate made by the CTP device 702. Further, the BEP 600 is connected in parallel to the CTP device 702 (via the high-speed LAN). A high-speed printer 746 similar to the image forming apparatus 11 is connected to this BEP 600.

Further, an output device 730, high-speed printers 740 and 742 having the same configuration, and a CTP device 700 are connected to the output side of the BEP 604 connected to the high-speed LAN. The output device 730 and the high-speed printers 740 and 742 output prints and the CTP device 700 produces a press plate. Further, the DFE processor 503 is connected to the printer proofers 700 and 722 having the same constriction via the BEP 603. The printer proofers 720 and 722 are used for recognizing output for printing and sometimes function as one example of the image forming apparatus.

Still further, the DFE processor 504 is connected to a high-speed printer 744, and the DFE processor 504 and the high-speed printer 744 are in charge of an on-demand printing processing. The DFE processor 506 is connected to an output device 732, and the DFE processor 508 is connected to a large-size output device 750. Both the configuration including the DFE processor 506 and the output device 732 and the configuration including the DFE processor 508 and the large-size output device 750 are the same as that of an image forming apparatus in the related art.

The image forming system of this embodiment has a configuration in which a device having a CTP function and a device having a function of POD (on-demand printing) can be mixed in the same system. This is because the BEP in accordance as a result embodiment has a function of subjecting the data obtained by converting the printing data from the client to raster data (RIP) to various kinds of processings.

Configuration Example

In the image forming system in accordance with the above configuration, to simplify descriptions of the embodiment of the invention, typical examples of a configuration of producing a press plate and performing printing by using the press plate and a configuration of performing printing without making a press plate will be described as one embodiment. That is, a configuration A in a case where an image is formed by using devices including the client terminal 400, the DFE processor 500, the CTP device 700 and the press device 710, and a configuration B in a case where an image is formed by using devices including the client terminal 400, the DFE processor 500, the BEP 600, and the high-speed printer 744 (image forming apparatus 11) will be described.

In this regard, the DFE processor 500 has a function of converting the data from the client terminal 400 to raster data (RIP) and compressing the raster image after conversion, but in this embodiment, a printer controller function acting as a printing control function depending on the image forming apparatus 11 is not required. That is, a configuration may be adopted in which the DFE processor 500 has only a RIP function.

FIGS. 2A and 2B are illustrations to show one embodiment of an image forming system in accordance with the invention. That is, a configuration A in which the DFE processor 500 subjects to the RIP an image, for which the client terminal 400 issues an instruction of printing and in which the CTP device 702 makes a press plate by using the image subjected to the RIP and in which the press 710 performs printing by using the press plate, and a configuration B in which the image subjected to the RIP is printed by the high-speed printer 746 (image forming apparatus 11) via the BEP 600 will be described as one embodiment of an image forming system in accordance with the invention. FIG. 2A shows the schematic configuration of a system including the configuration A and the configuration B of this embodiment and FIG. 2B shows a connection example of the configuration B.

[Configuration A]

In the configuration A, the system is constructed of the CTP device 702 for making a press plate, the DFE processor 500 which outputs printing data to this CTP device 702 and instructs it to make the press plate, and the press device 710 which performs printing by using the press plate made by the CTP device 702.

Since this configuration A is the same as in a conventional printing processing, detailed descriptions are not provided, but the DFE processor 500 includes a front end processor (FEP) and a function of converting the data from the client terminal 400 to raster image data (RIP) by an ROP (Raster Operation Processing) performed by a front engine to compress the raster image after the conversion. The DFE processor 500 mainly performs only RIP to produce a press plate. The CTP device 702 produces a press plate by using the raster image data of a raster image (compressed) subjected to this RIP. The press device 710 presses the image on a printing medium by using the press plate made by the CTP device 702, thereby performing printing of the image.

In the configuration A, a case, where the CTP device 702 is connected to the high-speed LAN and where the press plate is produced by using the printing data from the DFE processor 500, has been described. However, the CTP device 702 may be connected to the high-speed LAN via the BEP 600 (configuration including the BEP 604 and the CTP device 700 shown in FIG. 1). In this case, as described in the following constriction B, the BEP 600 performs a processing depending on a downstream device such as an image forming apparatus 11 by using printing data from the DFE processor 500 and outputs data. When the CTP device 700 is adopted as this downstream device, the BEP 600 performs a processing depending on the CTP device 700 and outputs data.

[Configuration B]

Next, in the configuration B, the system is constructed of the image forming apparatus 11, the DFE processor 500 which delivers printing data to the image forming apparatus 11 and instructs it to print the printing data, and the BEP 600 provided between the image forming apparatus 11 and the DFE processor 500.

The image forming apparatus 11 includes an IOT module (IOT main body) 12, a feed (paper feed) module 15, an output module 17, and a user interface unit 18 such as personal computer (PC). Here, the feed module 15 may be constructed of multiple stages. Further, a connection module for connecting the respective modules may be provided, if required. Still further, a finisher module (post-processing device) may be connected to the subsequent stage of the output module 17. The finisher modules include, for example, a module for stacking the sheets of paper and provided with a stapler for binding them at one or more positions or a module provided with a punching mechanism for punching holes in the sheets of paper.

The DFE processor 500 has a function of converting data received from the client terminal 400 to raster data (RIP) and compressing the converted raster data. That is, the DFE processor mainly performs RIP. This data is processed by the BEP 600 and is outputted to the image forming apparatus 11.

The BEP 600 has a function of controlling a processing depending on the image forming apparatus 11, and this control function may be instructed by a user with the user interface unit 18 or may be determined in advance. In the case of instructing the control function by the user interface unit 18, it is preferable that the user interface unit 18 has an input device such as keyboard and a GUI (Graphic User Interface) which presents an image to the user and simultaneously receives instruction input, and then instructs a processing depending on the image forming apparatus 11.

The BEP 600 utilizes the data stored in the DFE processor and already subjected to the RIP and hence can output data efficiently at high speeds. That is, the BEP 600 produces a command code on the basis of printing control information received from the DFE processor 500 and controls the processing timings of the respective sections in the image forming apparatus 11 according to the engine characteristics. Further, the BEP 600 completes a spool processing in such a way that the processing timings match with the engine characteristics of the IOT module 12, the feed module 15, or the output module 17, and then delivers the image data to the IOT module 12.

For example, data including a raster base image subjected to the RIP is sent from the DFE processor 500 to the BEP 600. This data includes not only image file data of a compressed raster base, for example, in the TIFF (Tagged Image File) format or the like, but also printing control information including, for example, the number of sheets to be printed, double-sided/single-sided, color/black and white, composite printing, with or without sorting, with or without stapling, and the like. Further, the printing control information other than the image file data of the raster base in the TIFF is described in a JDF (Job Definition Format) based on a description method of XML or the like and is sent as a job ticket from the DFE processor 500 to the BEP 600. Here, the JD format is sent to each process (for example, platemaking process, printing process, folding and cutting process, and the like) to be used in each process, and the contents described in the JD format are those necessary for the job in the each process. For example, the contents of printing specifications (configuration, quality of paper, size, the number of prints), equipment to be used in the platemaking process, delivery time of platemaking process, printing machine to be used for the printing process, ink to be used, equipment to be used for the folding and cutting process, delivery time, destination for delivery and delivery time, page allocation specifications of the platemaking process, procedures of RIP in the platemaking process, setting of an output device of the platemaking process, setting of a printer of the printing process, setting of a folding machine for folding and cutting process, procedures of a cutting machine, procedures of binding, and the like are described in the JD format.

Here, processings relating to the RIP such as rotation, page allocation in one sheet of paper (N-UP), repeat processing, matching of size of printing paper, a CMS (Color Management System) for correcting difference between devices, resolution conversion, contrast adjustment, and the designation of a compression ratio (low/middle/high) are performed by the DFE processor 500, and their control commands are not notified to the BEP 600 (no notification).

Further, as for the processings related to the processing characteristics of the image forming apparatus 11 (processings depending on IOT), such as collation, double-sided printing, shift processing related to the finisher such as stamp, punch, or stapler and like and the paper tray, matching of delivery faces (top and bottom (front and back)), calibration processings of correcting gray balance and out-of-register colors and the like, screen designation processing, and the like, the DFE processor 500 does not process their control commands, but rather the BEP 600 processes them.

In this manner, the DFE processor of this embodiment transfers jobs to the BEP unilaterally irrespective of the engine characteristics in the order in which the jobs are subjected to the RIP, and the BEP rearranges the jobs on a page for printing.

Figure 3:
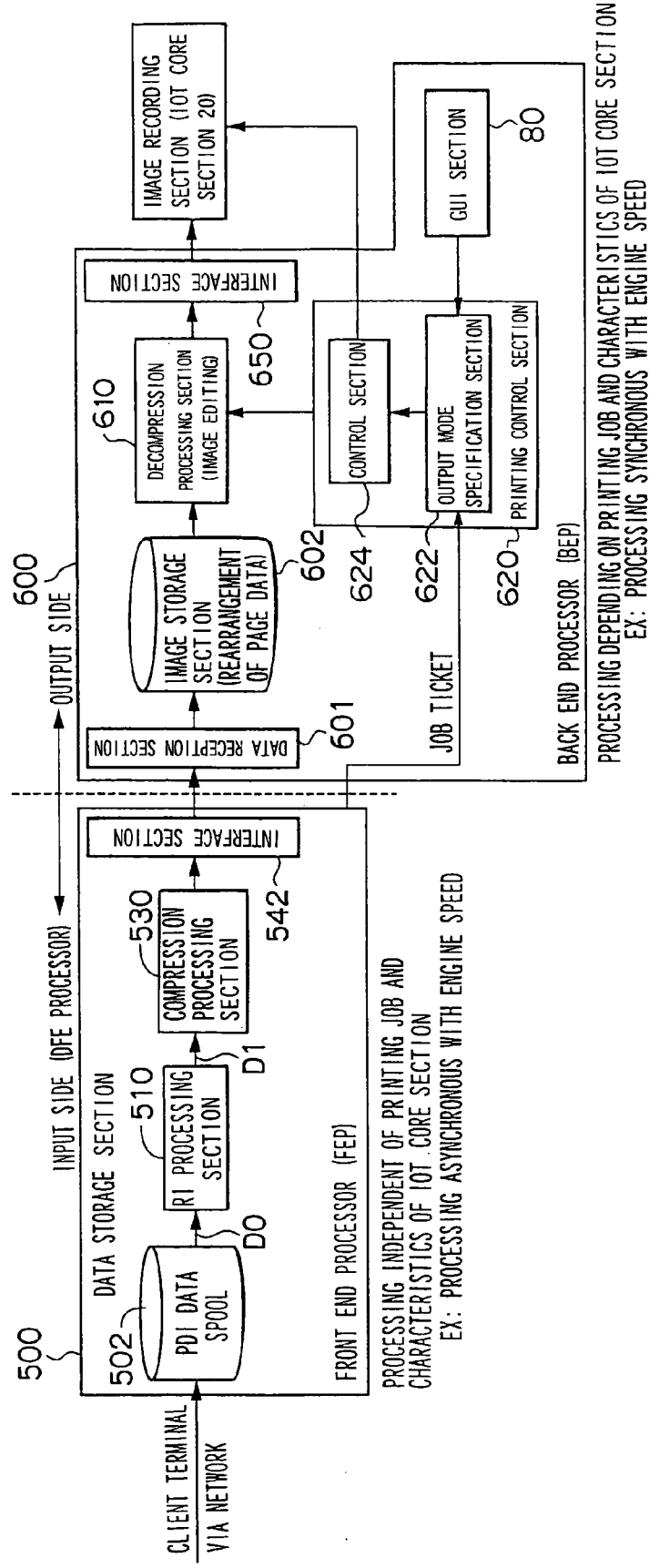
FIG. 3 is a block diagram to show one embodiment of a DFE processor and a BEP.

FIG. 3 is a conceptual block diagram drawing attention to the flow of data when the BEP 600 is interposed between the DFE processor 500 and the image forming apparatus 11.

The DFE processor 500 includes a data storage section 502 which receives printing data (hereinafter referred to as "PDL data") described in the PDL from the client terminal 400 and once stores the PDL data in succession, an RIP section 510 which reads the PDL data from the data storage section 502, interprets the PDL data, and produces (rasterizes) image data (raster data) by page, and a compression processing section 530 which compresses the image data produced by the RIP section 510 according to a predetermined format. An interface section 542 is provided in the subsequent stage of this compression processing section 530. In order to develop the PDL data to produces the image data, the RIP section 510 has a decomposer functioning as a PDL interpretation section and an imager, that is, a so-called RIP engine, which is built-in. The compression processing section 530 compresses the image data from the RIP section 510 and transfers the compressed image data to the BEP 600 immediately.

On the other hand, the BEP 600 includes an image storage section 602 which receives and stores the compressed image data processed by the DFE processor 500 irrespective of the printing job and the processing characteristics of the print engine 30 (for example, processed in asynchronism with the processing speed of the print engine 30) and a decompression processing section 610 which reads the compressed data from both of the image storage section 602 and the DFE processor 500 side, performs a decompression processing responding to the compression processing of the compression processing section 530 of the DFE processor 500 side, and sends the decompressed image data to an IOT core section 20 side. This decompression processing section 610 has image processing functions of subjecting the image data, that is read from the image storage section 602 and is subjected to the decompression processing to processings of rotating the image, adjusting the position of the image on the paper, enlarging or contracting the image, or editing/dividing the image electronically. A data reception section 601 is provided in the preceding stage of the image storage section 602, and an output side interface section 650 is provided in the subsequent stage of the decompression processing section 610.

Further, the BEP 600 has a printing control section 620 functioning as a printer controller for controlling the respective sections of the BEP 600 and the IOT core section 20 according to the processing performance of the IOT core section 20. The printing control section 620 has an output mode specification section 622 that interprets (decodes) a job ticket from the DFE processor or receives a user instruction via a GUI section 80 and specifies output modes (image position in a page and the order or orientation of discharge of the paper) according to the processing characteristics of the print engine 30, the fixing device 70, or the finisher. The printing control section 620 also has a control section 624 which controls the respective sections of the print engine 30, the fixing device 70 or the finisher in such a way that the printed matter is outputted in the specified output mode. The output mode specification section 622 functions as an output mode information acquisition section for receiving information related to the output mode desired by a client and receives information related to the output mode by acquiring information described in the job ticket and the printing control information included in the image file data in the TIFF.

Hence, in the DFE processor 500, the image data rasterized (developed in image) from the page description language by the RIP section 510 is transferred to the BE processor 600 in the order of pages. The BEP 600 stores the image data transferred from the DFE processor 500 once in the image storage section 602 functioning as a buffer. The decompression processing section 610 reads the compressed image data from the image storage section 602, decompresses the image data, assembles the image data into page data (rearranges page data or electronically edits/divides) according to a printing job designated by the client terminal or the DFE processor 500, and prepares to transfer the page data to the designated print engine. Then, the BEP 600 sends out the page data to the IOT core section 20 in the predetermined order at a speed maximizing the productivity of the engine while exchanging control commands in synchronization with the processing speed of the print engine 30.

In this manner, it is preferable that the DFE processor 500 side transfers the jobs to the BEP 600 side unilaterally in the order in which the jobs are subjected to the RIP irrespective of the engine characteristics. Then, the BEP 600 takes charge of printing jobs such as rearranging the data for printing and processings depending on the print engine 30.

In this configuration, the processings related to the RIP are performed by the DFE processor, but when the RIP is required to be performed again, without requesting the DFE processor 500 to perform the RIP again (independently of the DFE processor 500), the data stored in the image storage section 602 is utilized again. This eliminates the need for the DFE processor 500 to perform the RIP again. Further, the BEP 600 having performance adaptable to the processing characteristics of the output side such as the print engine 30 and being connected to the print engine 30 or the like can perform the processings depending on the processing characteristics of the output side.

For example, reprocessings of examples required to be subjected to the processing depending on the processing characteristics of the output side in order to output data in the output mode desired by the client, and related to the RIP include page allocation in one sheet of paper (N-UP), repeat processing, matching of size of printing paper, CMS (Color Management System) for correcting difference between devices, resolution conversion, contrast adjustment, and designation of a compression ratio (low/middle/high).

Further, examples, in which processings depending on the processing characteristics of the image forming apparatus 11 (for example, print engine) of the output side (processings closely related to the processing characteristics of the output side) are required, include image rotation, collation, double-sided printing, image shift processing related to the finisher such as a stamp/punch/stapler or the paper tray, matching of delivery faces (top and bottom), calibration processing of correcting gray balance and the out-of-register colors and the like, screen designation processing, and the like.

FIGS. 4A and 4B are illustrations showing an example of a usage mode of the system in accordance as a result embodiment. FIG. 4A is an illustration showing the processing of a back end processor related to the output mode based on the instruction of a client, and FIG. 4B is an illustration showing the processing of a back end processor in a case where an abnormality occurs at the output side.

As shown by the first item in FIG. 4A, when an output mode specification section 622 which functions as an output mode information acquisition section receives information expressing an instruction for double-sided printing output as information related to the output mode desired by the client, the control section 624 controls the decompression processing section 610 in the BEP 600 in such a way that the decompression processing section 610 produces single-sided images in the order of sequence depending on the processing characteristics of the print engine 30 and the fixing device 70 at the output side and outputs the single-sided image to the print engine 30 side. As a result, the double-sided images are produced in the order of sequence depending on the processing characteristics of the output side.

For example, the BEP 600 outputs the images in the sequence of placement of a printing paper, on which a page is printed, on a belt on the print engine 30 side on the basis of the instruction for double-sided printing delivery designated via the DFE processor 500 (by a client). To be more specific, the DFE processor 500 performs the RIP in the order of: 1st sheet top (P1T)→1st sheet bottom (P1B)→2nd sheet top (P2T)→2nd sheet bottom (P2B)→3rd sheet top (P3T)→3rd sheet bottom (P3B) →. . . , and sends the produced image data to the BEP 600 in sequence.

In contrast to this, the BEP 600 may have a sequence of: 1st sheet top (P1T)→2nd sheet top (P2T)→3rd sheet top (P3T)→4th sheet top (P4T)→5th sheet top (P5T)→1st sheet bottom (P1B)→6th sheet top (P6T)→2nd sheet bottom (P2B)→7th sheet top (P7T)→3rd sheet bottom (P3B)→. . . . This sequence is different depending on the processing characteristics related to the printing speed of the device.

Further, as shown by the second item in FIG. 4A, the DFE processor 500 subjects each page to the RIP for the respective color components of Y (yellow), M (magenta), C (cyan), and B (black) in parallel and sends the image data of YMCK for each page to the BEP 600. In this case, if the print engine 30 is a four-cycle engine for processing the image in the order of Y→M→C→K, basically, the BEP 600 changes the order of pages to be processed as follows: 1st sheet Y (yellow)→1st sheet M (magenta)→1st sheet C (cyan)→1st sheet K (black)→2nd sheet Y→2nd sheet M→2nd sheet C→2nd sheet K→. . . , to perform the processings.

Further, in the case of incorporating the double-sided printing in the processing of the second item described above, as shown by the third item in FIG. 4, the DFE processor 500 sends the image data to the BEP 600 in the order of top→bottom for each page, that is, 1st sheet top (P1 YMCKT)→1st sheet bottom (P1 YMCKB)→2nd sheet top (P2 YMCKT)→2nd sheet bottom (P2 YMCKB)→. . . . In correspondence to this, the BEP 600 changes the order of pages to be processed as follows: for example, 1st sheet Y top (P1YT)→1st sheet M top (P1MT)→1st sheet C top (P1CT)→1st sheet K top (P1KT)→2nd sheet Y top (P2YT)→2nd sheet M top (P2MT)→1st sheet Y bottom (P1YB)→2nd sheet C top (P2CT)→1st sheet M bottom (P1MB)→2nd sheet K top (P2KT)→. . . , to perform the processings.

In this manner, the BEP 600 can control the formation of the images in the sequence suitable for the device according to the processing characteristics of the output side (including the form of configuration of the print engine) without affecting the DFE processor 500 (without placing a burden on the DFE processor 500).

Further, as shown by the fourth item in FIG. 4A, when an output mode specification section 622 having a function of an output mode information acquisition section receives information expressing an instruction related to collation as information related to the output mode desired by the client, the control section 624 controls the decompression processing section 610 in the BEP 600 in such a way that the decompression processing section 610 performs a collation processing according to a delivery face depending on the processing characteristics of the output side (image recording section). As a result, a printed sheet can be delivered in the orientation desired by the client without depending on the processing characteristic of delivery of the output side.

For example, in a case where either face-up or face-down can be selectively instructed as an instruction of the face of a printed sheet to be delivered, to prepare the printed sheets arranged in the order of pages when the sheets are delivered face down, the printed sheet can be outputted as usual from the first page of the job. However, to prepare the printed sheets arranged in the order of pages when the sheets are delivered face up, it is necessary to output the sheets from the last page of the job (to change the order of page of the sheets to be processed). Since the BEP 600 of this embodiment can read the desired page from the image recording section 602 and process it, the BEP 600 can read pages in the rearranged order from the image recording section 602 without affecting the DFE processor 500 (without placing a burden on the DFE processor 500) and subject the pages to the decompression processing, and then output the decompressed pages to the print engine 30.

Further, as shown by the fifth item in FIG. 4A, when an output mode specification section 622 having a function of an output mode information acquisition section receives information expressing an instruction related to a binding position as information related to the output mode desired by the client, the control section 624 controls the decompression processing section 610 in the BEP 600 in such a way that the decompression processing section 610 adjusts a binding position to a position depending on the processing characteristics of the output side (image recording section).

Hence, in a case where finishers (option) including a stamp, stapler, or punch are required, the BEP 600 can perform an image editing processing such as image rotation or image shifting according to the places where the printed sheets are bound without affecting the DFE processor 500 (without placing a burden on the DFE processor 500) and can send the image data adjusted in position to the print engine 30.

In this regard, when the image is adjusted in position on the printing paper, depending on the amount of shifting, a portion of the original image may extend off the printing paper or a portion may be caused not to be printed (so-called image truncation) even if it does not extend off the printing paper. In this case, it is also preferable to contract the size of the image slightly (size adjustment processing) and to send the contracted image data to the print engine 30. Here, it is also preferable to contract the size of the image only in the necessary direction of the longitudinal and lateral directions in accordance with the image shifting (independent contraction).

Further, as shown in FIG. 4B, when the sheets of printing paper get jammed at the delivery in the process of the printing job, the control section 624 controls the respective functional sections in the back end processor in such a way that they perform recovery processings for the paper jamming according to the processing characteristics of the output side (image recording section).

For example, in a case where the image can not be delivered because the sheets of printing paper get jammed at the IOT module 12 or the output module 17 or because electric power is turned off, the BEP 600 reads the desired but not-yet-outputted page (not-yet-processed page) from the image recording section 602 and sends it to the print engine 30. As a result, a recovery processing can be realized by the BE processor 600 side alone without affecting the DFE processor 500 side (without placing a burden on the DFE processor 500).

Here, one example of detailed processing performed by the BEP 600 will be described in consideration of the above-described mode of use of the system of this embodiment.

The image data produced by the RIP and allocated on a plate is usually used in a large size of 1 m square. However, in the POD, the image data is printed on the paper in units of one page, and hence even the largest size of the image data usually measures about 19 inches. That is, in the case of using the image data subjected to the RIP for the CTP method and the POD in common, the image data allocated on the plate for the CTP method can not be outputted to the POD as it is. Hence, the system of this embodiment calculates layout information such as arrangement of allocation and pasting position of each page by the BEP 600 from a file size with reference to the orientation tag of image file data, produced by an RIP and described in a TIFF, edits the image data electronically according to the result of the calculation, then activates the print engine 30 to start after the electronic editing, specifies predetermined printing paper automatically, and outputs the image data to the print engine 30.

Figure 5:
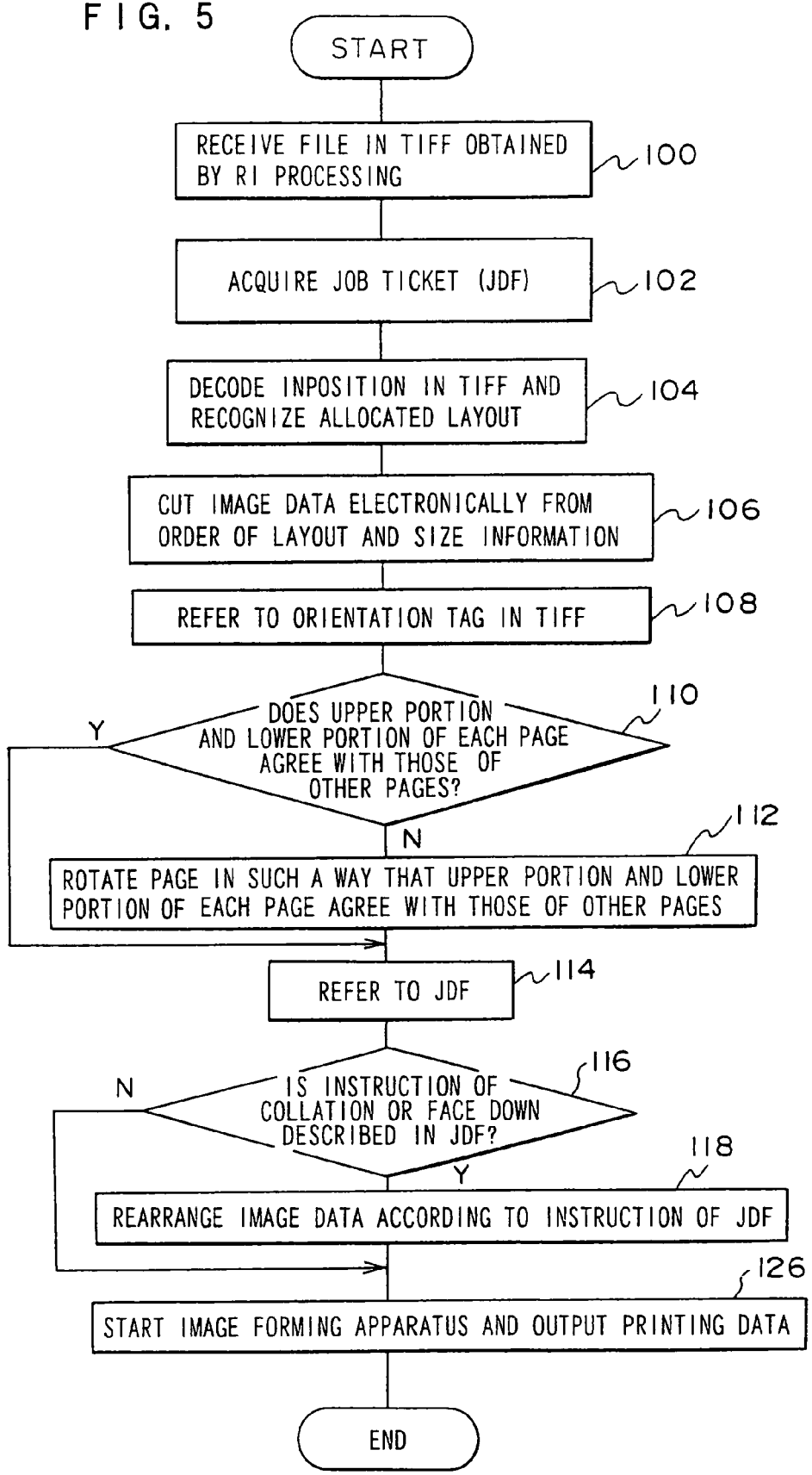
FIG. 5 is a flow chart to show the flow of one example of a detailed processing performed by the BEP.

FIG. 5 shows a flow chart illustrating one example of the flow of processing performed by the BEP 600 at this time.

When the image data of a large size for the CTP method is produced by the RIP section 510 and is outputted to the BEP 600, in the BEP 600, first, at step 100, the image data (image file data in the TIFF) subjected to the RIP by the RIP section 510 of the DFE processor 500 is received by the data reception section 601. Then, the routine proceeds to step 102 where a job ticket is acquired by the printing control section 620.

At step 104, Inposition in the TIFF is decoded by the output mode specification section 622, and a layout allocated on the page is recognized. That is, as a result, the layout (allocation position) of each page allocated in the image data of a large size can be detected. This step 104 corresponds to a processing by the detection section of the invention.

Next, at step 106, the control section 624 controls the decompression processing section 610 according to the order of the layout and size information, thereby editing the image data electronically. That is, the image data of a large size is electronically edited/divided into the image data of a size that can be outputted by the POD.

Then, at step 108, the orientation tag in the TIFF is referred to by the output mode specification section 622, and then the routine proceeds to step 110 where it is determined whether or not the upper portion and lower portion of the image of each electronically edited page correspond with those of the other pages. If the result of determination is negative, the routine proceeds to step 112 where the printing control section 620 controls the image storage section 602 and the decompression processing section 610, thereby rotating the image in such a way that the upper portion and lower portion of each page correspond with those of the other pages, and then the routine proceeds to step 114. On the other hand, if the result of determination at step 110 is affirmative, the routine proceeds directly to step 114.

At step 114, the job ticket (JDF) is referred to by the printing control section 620, and the routine proceeds to step 116 where it is determined whether or not an instruction for collation or an instruction for face down printing is described in the job ticket.

If the result of determination is affirmative, the routine proceeds to step 118 where the image data of each electronically edited page is rearranged according to the instruction of the job ticket, and then routine proceeds to the step 126. On the other hand, if the result of determination at step 116 is negative, the routine proceeds directly to step 126.

At step 126, the image forming apparatus 11 is started by the control section 624, and the image data of each electronically edited page is outputted as printing data in a sequence suited for the processing characteristic of the print engine 30 of the output side to the print engine 30 in sequence, whereby a series of processings are finished. That is, when the control section 624 activates the image forming device 11 to start, the control section 624 acquires the print sequence of the image forming device 11, rearranges the image data of each electronically edited page according to the acquired print sequence, and outputs the image data in this sequence to the print engine 30. As a result, it is possible to subject the image data to the processing according to the processing characteristics of the output side and to then transfer the image data to the outside.

In this regard, step 108, step 112 and step 118 correspond to the processings of the image processing section of the invention.

Figure 6:
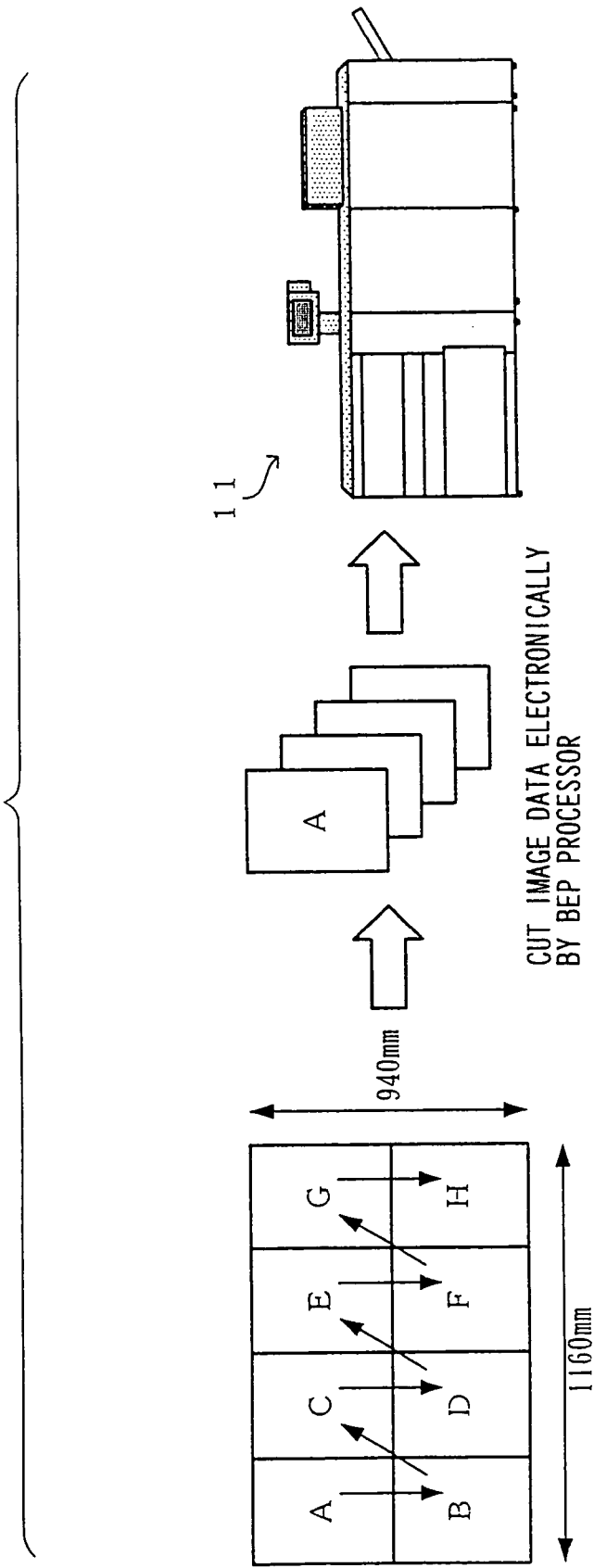
FIG. 6 is a schematic illustration to show an image of electronic editing performed by the BEP.

In the above-described processing of the BEP 600, for example, when the image data produced by the RIP is allocated in the order of pages of A→B→C→D →E→F→G→H, as shown in FIG. 6, the BEP 600 can edit the image data electronically in such a way that the order of pages becomes the order of A to H and then can output the image data in this order to the print engine 30.

Further, at this time, in a case where the upper portion and lower portion of any one of pages A to H of the image data produced and allocated by the RIP is reversed, the electronically edited image data can be rotated so as to make the upper portion and lower portion thereof correspond with those of the others and then the image data can be outputted to the print engine 30. Hence, the image data produced and allocated by the RIP can be used for the POD.

That is, the performing of the processing in this manner by the BEP 600 makes it possible to share the RIP, the CTP method, and the POD, to thus reduce costs of the font and allocation software of the RIP, and further to divide a job required to be quickly delivered and a job of a large amount and required to be of high quality among identical DFE processors 500.

According to the embodiment, the image data of a large size that is processed independently of the processing characteristics of the image forming apparatus and is allocated for a press plate is received and stored. Further, information related to an output mode desired by a client is acquired and, allocation information related to an allocation position is detected on the basis of the acquired information related to the output mode. That is, as for the image data subjected to the RIP for the CTP method, plural image data are allocated to be made one set of image data, so that the layout of the individual images allocated to the one set of image data can be detected by detecting the allocation information.

Further, the image data of a large size is electronically edited/divided on the basis of the detected allocation information. That is, dividing positions are determined according to the detected layout of the individual images, and the image data is electronically edited. Hence, the allocated image data is electronically edited (divided) to be converted to the image data of a size that can be processed by the on-demand printing and then is transferred to the image forming apparatus, so that the image data produced for the CTP method can be used for the on-demand printing.

In this manner, the allocation information related to allocation is detected and the image data of a large size is electronically edited/divided on the basis of the detected allocation information, so that the image data of a large size subjected to the RIP for the CTP method can be used for the on-demand printing that processes image data of a size smaller than the large size.

A processing of truing up the orientation of each image data after the editing may further be performed. Truing up the orientation of each image data in this manner eliminates the need for truing up the orientation of pages after printing the images and thus makes it possible to perform a postprocessing such as punching or stapling with ease.

Further, it is also preferable that the second aspect of the invention includes controlling each internal functional section in such a way that the acquired image data is subjected to a processing depending on the image forming apparatus and then the processed image data is sent to the image forming apparatus. The inclusion of the printing control step makes it possible to perform a printing control according to the image forming apparatus at the output side.

Embodiment 2

Another example of the embodiment of the invention will be described in detail with reference to the drawings.

Since the image forming system and the configuration example are the same as those in the embodiment 1, their descriptions will be omitted, and the same elements are denoted by the same reference symbols.

Figure 7:
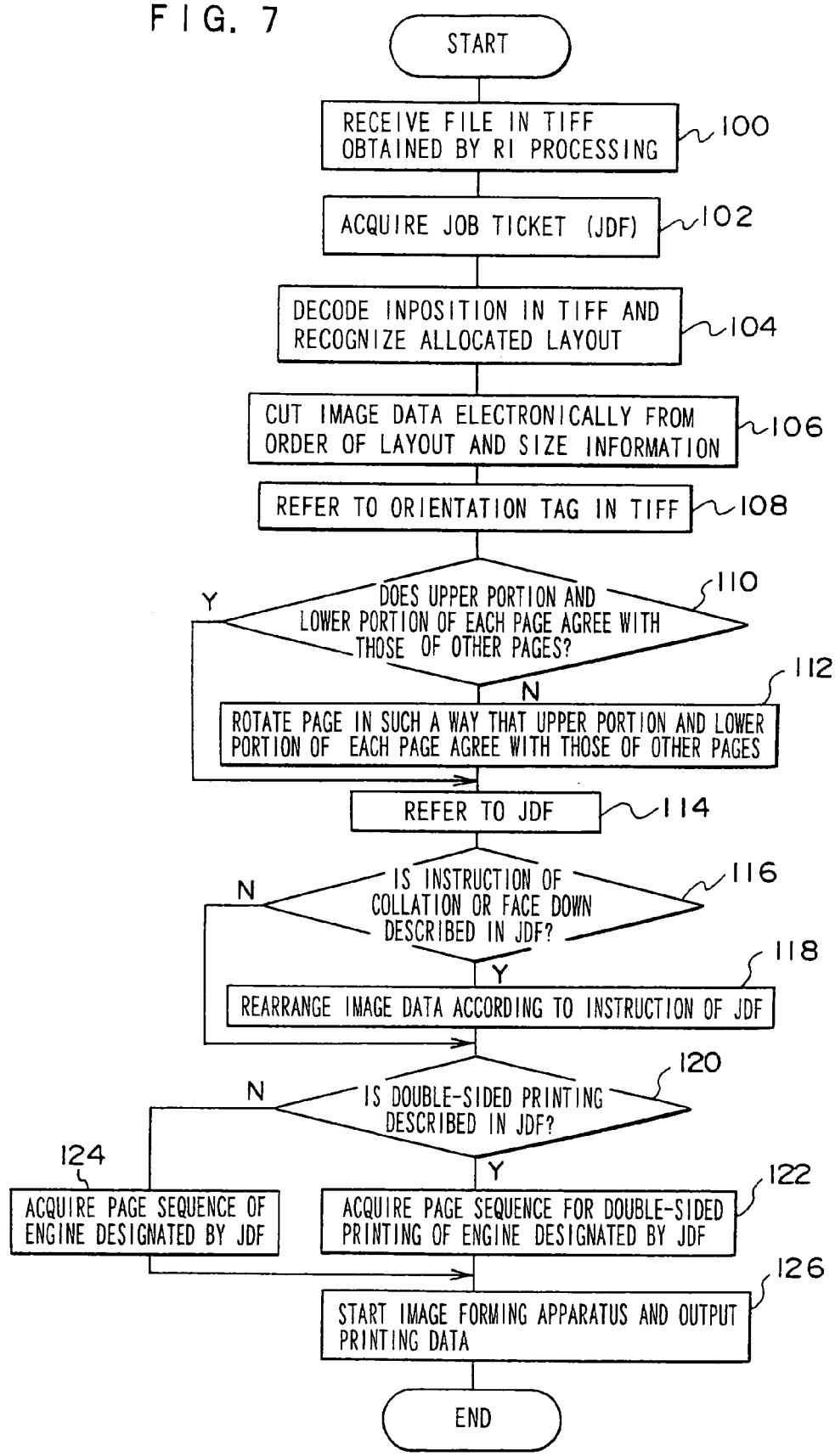
FIG. 7 is a flow chart to show the flow of another example of a detailed processing performed by the BEP.

The embodiment 1 does not present any problem in the case of printing an image only on the top of the paper, but when an image is also printed on the bottom of the paper, the image to be printed on the bottom of the paper is outputted from another plate. Hence, in this embodiment, further, the BEP 600 ascertains the allocated layout of each plate, position information, instruction of the printing side (top (front) and/or bottom (back)) of the paper to be provided to the engine side, and the page sequence of the engine side, and sorts the respective electronically edited images from the image data of a large size also in consideration of the printing side of paper (top and/or bottom), to thereby output the image data to the print engine 30. FIG. 7 is a flow chart showing one example of the flow of the processing performed at this time by the BEP 600.

When the image data of a large size for the CTP method is produced by the RIP section 510 and is outputted to the BEP 600, in the BEP 600, first, at step 100, the image data (image file data in the TIFF) subjected to the RIP by the RIP section 510 of the DFE processor 500 is received by the data reception section 601. Then, the routine proceeds to step 102 where a job ticket is acquired by the printing control section 620.

At step 104, Inposition in the TIFF is decoded by the output mode specification section 622 and the layout allocated on the page is recognized. That is, as a result, the layout (allocation position) of each page allocated in the image data of a large size can be detected. This step 104 corresponds to a processing by the detection section of the invention.

Next, at step 106, the control section 624 controls the decompression processing section 610 according to the order of layout and size information, thereby cutting the image data electronically. That is, the image data of a large size is electronically cut into the image data of a size that can be outputted by the POD.

Then, at step 108, the orientation tag in the TIFF is referred to by the output mode specification section 622, and then the routine proceeds to step 110 where it is determined whether or not the upper portion and lower portion of the image of each electronically edited page correspond with those of the other pages. If the result of determination is negative, the routine proceeds to step 112 where the printing control section 620 controls the image storage section 602 and the decompression processing section 610, thereby rotating the image in such a way that the upper portion and lower portion of each page correspond with those of the other pages, and then the routine proceeds to step 114. On the other hand, if the result of determination at step 110 is affirmative, the routine proceeds directly to step 114.

At step 114, the job ticket (JDF) is referred to by the printing control section 620, and the routine proceeds to step 116 where it is determined whether or not an instruction of collation or an instruction of face down printing is described in the job ticket. The processings up to this point are the same as those in the embodiment 1.

Unlike in the embodiment 1, if the result of determination is affirmative, the routine proceeds to step 118 where the image data of each page electronically edited by the decompression processing section 610 is rearranged according to the instruction of the job ticket, and then the routine proceeds to the step 120. On the other hand, if the result of determination at step 116 is negative, the routine proceeds directly to step 120.

At step 120, it is determined whether or not an instruction for double-sided printing is described in the job ticket (JDF) referred to at step 114. If the result of determination is affirmative, the routine proceeds to step 122 where the page sequence instructed by the JDF is acquired. That is, when double-sided printing is performed, the printing is performed in a print sequence different for each print engine, so that, in order to perform the double-sided printing efficiently, the image data is required to be outputted to the print engine in the order of pages according to each print engine. Hence, at step 122, the page sequence specific to each print engine when the double-sided recording is performed is acquired. Here, the page sequence is acquired from the print engine designated by the JDF.

On the other hand, if the result of determination at step 120 is negative, the routine proceeds to step 124 where the page sequence specific to each print engine designated by the JDF is acquired, from the print engine and the routine proceeds to step 126.

At step 126, the image forming apparatus 11 is activated to start by the control section 624, and the image data of each electronically edited page is outputted as printing data in a sequence suited for the processing characteristic (acquired page sequence) of the print engine 30 of the output side to the print engine 30 in sequence, whereby the series of processings is finished. That is, when the control section 624 activates the image forming device 11 to start, the control section 624 acquires the print sequence of the image forming device 11, rearranges the image data of each electronically edited page according to the acquired print sequence, and outputs the image data in this sequence to the print engine 30. As a result, it is possible to subject the image data to the processing according to the processing characteristics of the output side and then to transfer the image data to the outside.

In this regard, step 106, step 112 and step 118 correspond to the processings of the image processing section of the invention. Step 120 corresponds to the processing of the determination section of the invention. Step 122 and step 124 correspond to the processing of the processing characteristic acquisition section of the invention. Step 126 corresponds to the processing of the collation section of the invention.

In the above-described processing of the BE processor 600, for example, when the image data produced by the RIP is allocated in the order of pages of A→B→C→D→E→F→G→H, as shown in FIG. 6, the BEP 600 can edit the image data electronically in such a way that the order of pages becomes the order of A to H and then can output the image data in this order to the print engine 30.

Further, at this time, in a case where the upper portion and lower portion of any one of pages A to H of the image data produced and allocated by the RIP is reversed, the electronically cut image data can be rotated so as to make the upper portion and lower portion thereof correspond with those of the others and then can be outputted to the print engine 30. Hence, the image data produced and allocated by the RIP can be used for the POD.

Still further, when double-sided printing is performed, the print sequence of the double-sided printing is acquired from each print engine because each print engine has a different print sequence, and the electronically edited image data is sorted (rearranged) so as to output the image data according to the acquired print sequence. Hence, even the image data for the CTP method can be printed on both sides of the paper at high speeds as is the case with the on-demand printing.

Figure 8:
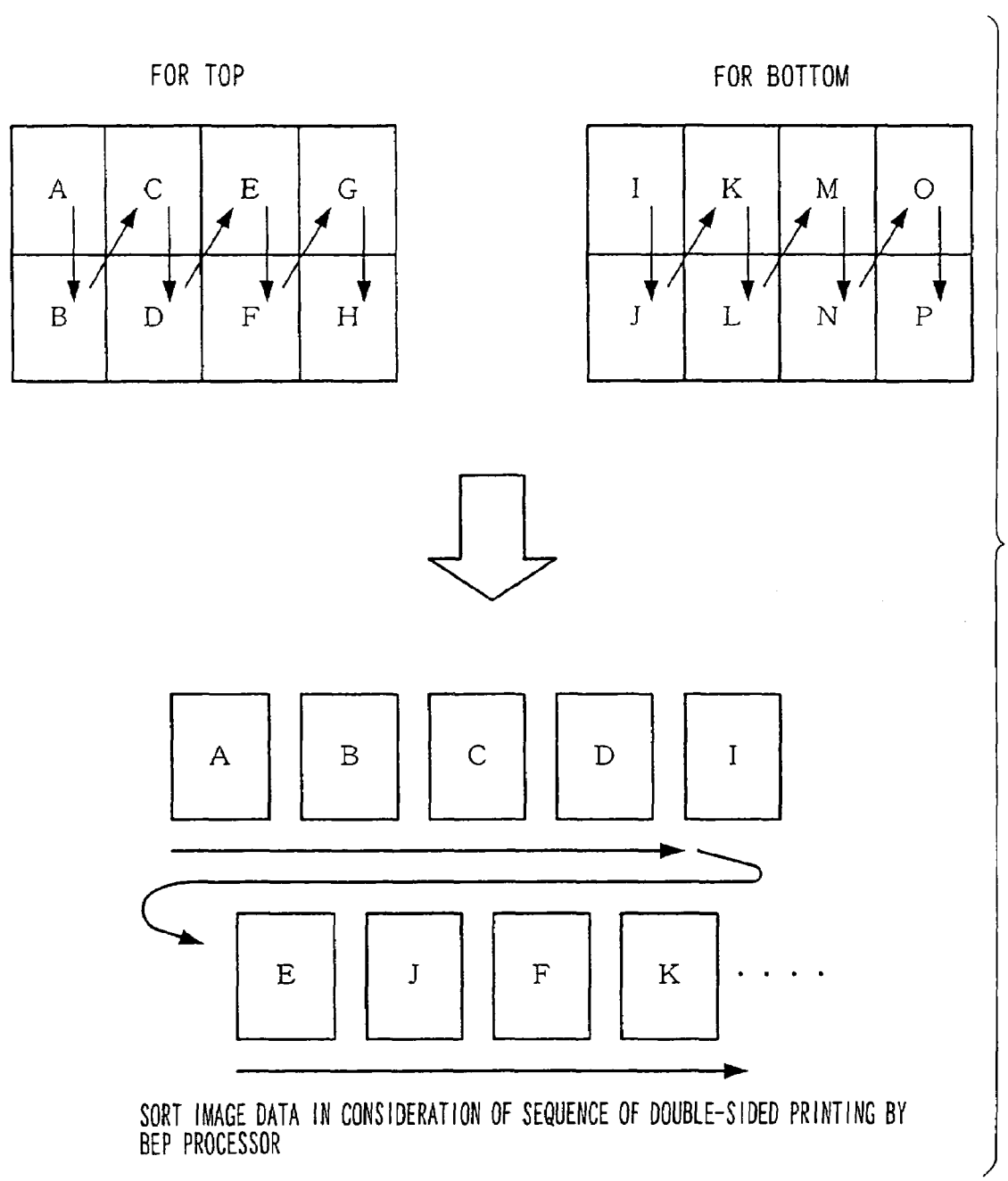
FIG. 8 is a schematic illustration to show one example of sorting of an image in consideration of top and bottom recording, performed by the BEP.

For example, in the CTP device 700, in the case of double-sided printing, there are cases where a plate for the top (front) and a plate for the bottom (back) are made, as shown in FIG. 8, to perform the double-sided printing. In the case of performing the on-demand printing by using the image data in this case, as described above, layout information is detected with reference to the tag in the TIFF, the image data is electronically edited, then, as shown in the lower portion in FIG. 8, a print sequence, which is different among the respective devices, is acquired, and the electronically edited image data is rearranged according to the acquired print sequence. For example, although the tops are arranged in the order of A to H and the bottoms are arranged in the order of I to P in FIG. 8, they are rearranged, for example, in the order of A→B→C→D→I→E→J→F→K according to the acquired print sequence, which is different among the respective devices, and are outputted to the print engine in sequence.

Further, as shown in FIG. 9, there is also a case where the tops and the bottoms are allocated in one set of image data, but in the case of performing the on-demand printing by using the image data in this case, layout information is detected with reference to the tag in the TIFF and the image data is electronically edited, then, as shown in the lower portion in FIG. 9, a print sequence, which is different among the respective devices, is acquired, and the electronically edited image data is rearranged according to the acquired print sequence. For example, in FIG. 9, the first image data of a large size allocated in the order of A (top), B (bottom), C (bottom), D (top), E (top), F (bottom), G (bottom), and H (top) (in the order shown in the upper portion in FIG. 8) and the second image data of a large size allocated in the order of I (top), J (bottom), K (bottom), L (top), M (top), N (bottom), O (bottom), and P (top) (in the order shown in the upper portion in FIG. 8) are rearranged (sorted) in the order of A (top)→D (top)→ E (top)→H (top)→B (bottom)→I (top)→C (bottom)→K (bottom)→F (bottom) →L (top)→G (bottom)→ M (top)→. . . , and then are outputted to the print engine in sequence.

In this manner, in this embodiment, in the case of editing the image data of a large size electronically and performing the double-sided printing, the electronically edited image data is rearranged according to the print sequence, which is different among the respective devices, and is outputted to the print engine, so that the double-sided printing can be performed from the image data for the CTP method.

According to the embodiment, the image data of a large size that is processed independently of the processing characteristics of the image forming apparatus and is allocated for a press plate is received and stored. Further, information related to an output mode desired by a client is acquired and, allocation information related to an allocation position is detected on the basis of the acquired information related to the output mode. That is, as for the image data subjected to the RIP for a CTP method, plural image data are allocated to be made one set of image data, so that the layout of the individual images allocated to one image data can be detected by detecting the allocation information.

Further, the image data of a large size is electronically edited/divided on the basis of the detected allocation information. That is, dividing positions are determined according to the detected layout of the individual images, and the image data is electronically edited/divided. Hence, the allocated image data is electronically edited (divided) to be converted to the image data of a size that can be processed by the on-demand printing and then is transferred to the image forming apparatus, so that the image data produced for the CTP method can be used for the on-demand printing.

Further, it is determined whether or not the image data is to be recorded on both sides of the printing paper on the basis of the acquired information related to the output mode, and the processing characteristic of the image forming apparatus is acquired. Then, the electronically edited/divided image data is rearranged on the basis of the determination result of the determining and the acquired processing characteristic of the image forming apparatus. That is, the respective image data is arranged in consideration of recording the image data on the top and bottom of the printing paper and in the order according to the processing characteristic depending on the image forming apparatus and is transmitted to the image forming apparatus. Hence, even the image data of a large size that is produced for the CTP method and is to be recorded on the top and bottom of the printing paper can be used for the on-demand printing.

A processing of truing up the orientation of each image data after the editing may be further preformed. Truing up the orientation of each image data in this manner eliminates the need for truing up the orientation of pages after printing the images and thus makes it possible to perform a postprocessing such as punching or stapling with ease.

Embodiment 3

Hereafter, still another example of an embodiment of the invention will be described in detail with reference to the drawings.

Figure 10:
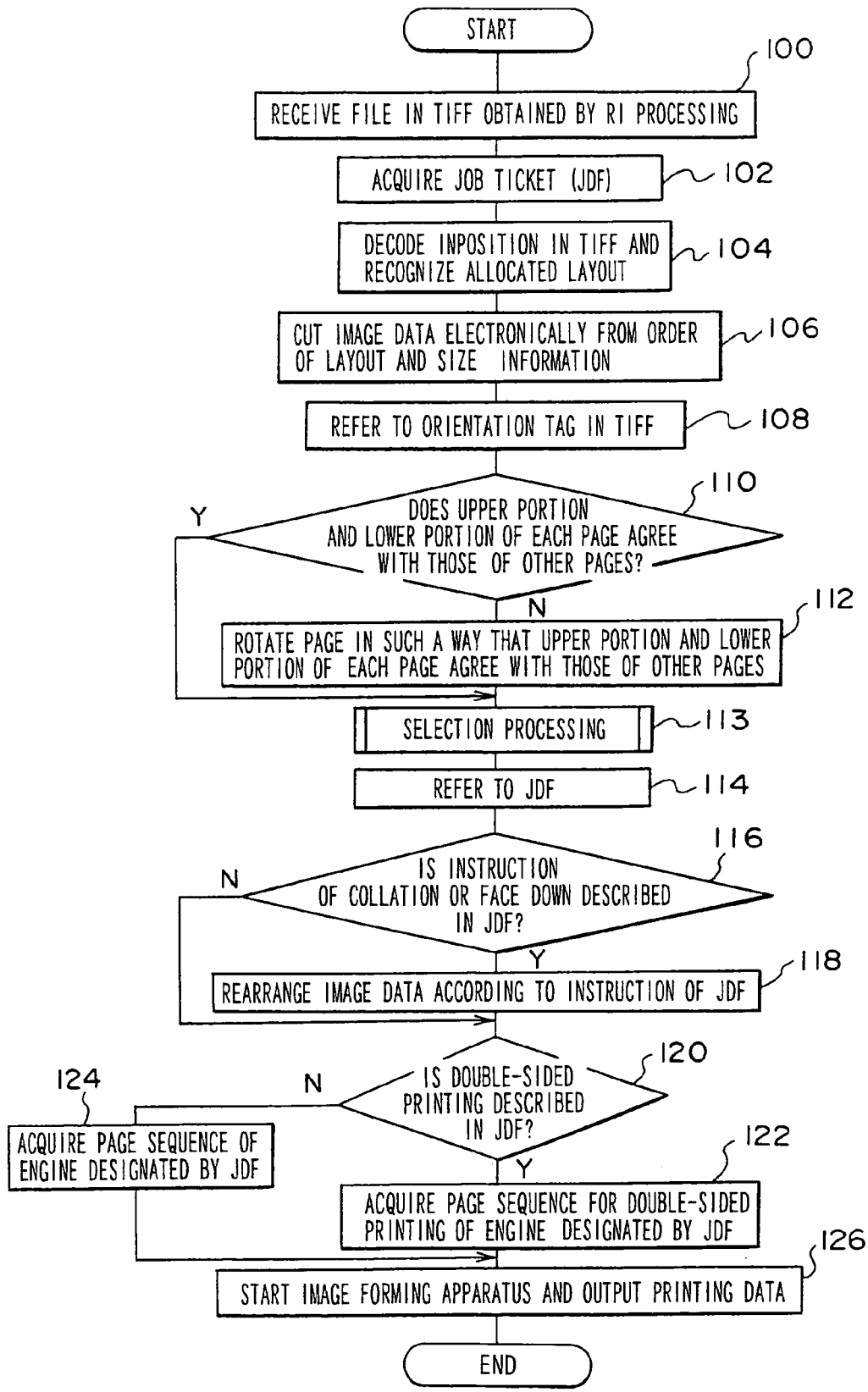
FIG. 10 is a schematic illustration to show still another example of sorting of an image in consideration of top and bottom recording, performed by the BEP.

When compared with the embodiment 2, this embodiment is different in that whether the image is printed by the CTP device 702 or by the POD (image forming apparatus 11) can be selected according to the kind of image and the like of each electronically edited page. The other elements are the same as those in the embodiment 2, and hence descriptions thereof will be omitted. Further, the same elements are denoted by the same reference symbols. FIG. 10 is a flow chart showing one example of the processing performed at this time by the BEP. When compared with the flow chart shown in FIG. 7 in the embodiment 2, this flow chart is different in that a selection processing step 113 is added.

When the image data of a large size for the CTP method is produced by the RIP section 510 and is outputted to the BEP 600, in the BEP 600, first, at step 100, the image data (image file data in the TIFF) subjected to the RIP by the RIP section 510 of the DFE processor 500 is received by the data reception section 601. Then, the routine proceeds to step 102 where a job ticket is acquired by the printing control section 620.

At step 104, Inposition in the TIFF is decoded by the output mode specification section 622, and the layout allocated on the page is recognized. That is, as a result, the layout (allocation position) of each page allocated in the image data of a large size can be detected. This step 104 corresponds to a processing by the detection section of the invention.

Next, at step 106, the control section 624 controls the decompression processing section 610 according to the order of layout and size information, thereby editing the image data electronically. That is, the image data of a large size is electronically edited/divided into the image data of a size that can be outputted by the POD. The processings up to this point are the same as those in the embodiment 2.

Unlike in the embodiment 2, next, at step 108, the orientation tag in the TIFF is referred to by the output mode specification section 622, and then the routine proceeds to step 110 where it is determined whether or not the upper portion and lower portion of the image of each electronically edited page correspond with those of the other pages. If the result of determination is negative, the routine proceeds to step 112 where the printing control section 620 controls the image recording section 602 and the decompression processing section 610, thereby rotating the image in such a way that the upper portion and lower portion of each page correspond with those of the other pages, and then the routine proceeds to step 113. On the other hand, if the determination at step 110 is affirmative, the routine proceeds directly to step 113.

Figure 11:
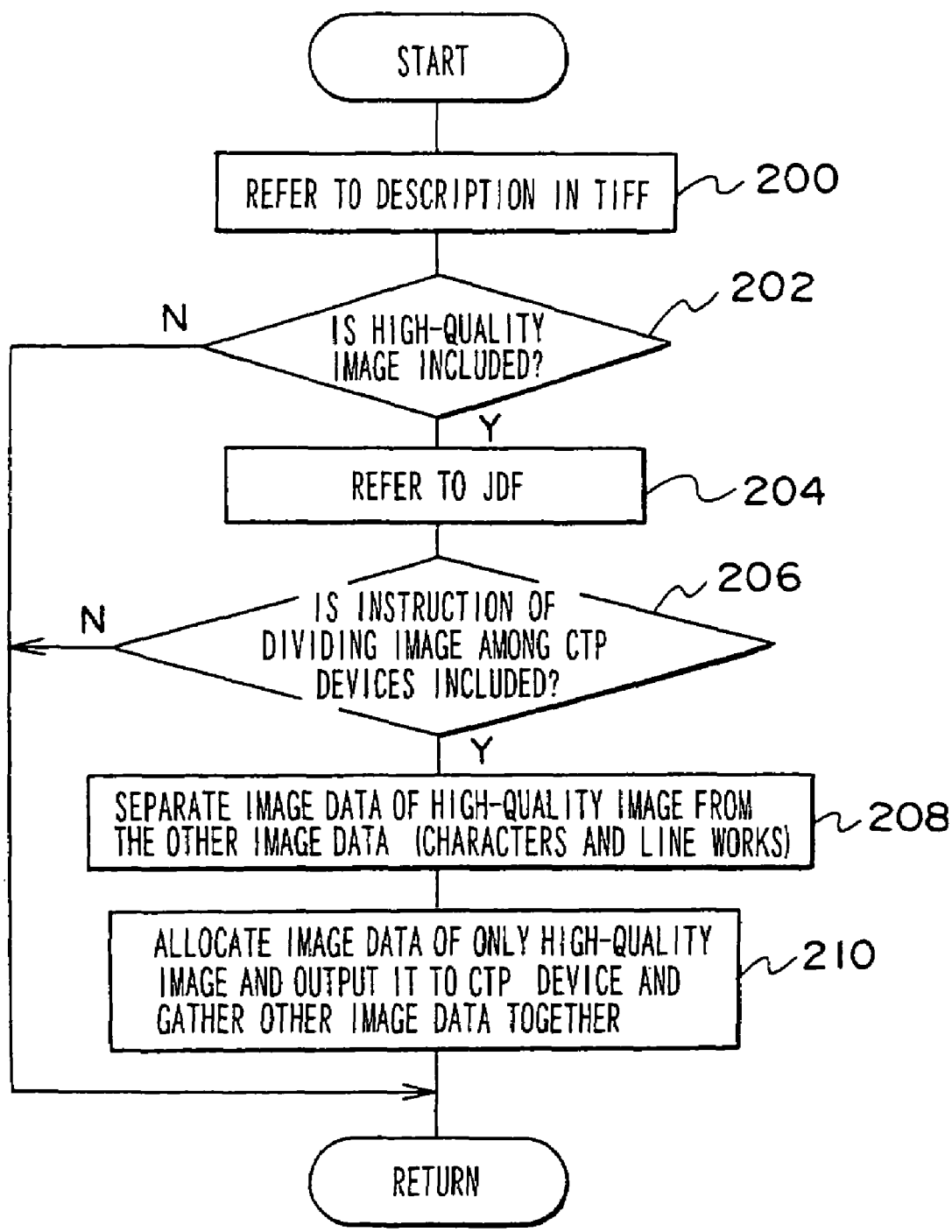
FIG. 11 is a flow chart to show the flow of a selection processing.

At step 113, the printing control section 620 performs a selection processing. The selection processing is one that extracts the image data and the like of high quality and divides the image data among the CTP devices 702 in a case where the electronically edited image data includes the image data and the like of high quality that might be desired to be printed by the CTP device 702. FIG. 11 is a flow chart to show the flow of the selection processing.

Here, the selection processing will be described in detail with reference to FIG. 6.

At step 200, Description in the TIFF is referred to by the output mode specification section 622, and the routine proceeds to step 202.

At step 202, it is determined from the Description in the TIFF by the printing control section 620 whether or not a high-quality image is included. That is, it is determined whether or not the electronically edited image data includes image data of high-quality images. Here, the determination at step 202 may be a determination other than whether or not the electronically edited image data includes high-quality images. That is, it is preferable to determine whether or not the electronically edited image data includes image data that is thought to be desired to be printed by the CTP device 702.

If the result of determination at step 202 is negative, the processing is finished as it is, and the routine proceeds to step 114 in the flow chart shown in FIG. 10.

Further, if the result of determination at step 202 is affirmative, the routine proceeds to step 204 where the job ticket (JDF) is referred to by the printing control section 620, and then the routine proceeds to step 206 where it is determined whether or not the JDF includes an instruction for dividing the image data among the CTP devices 702. If the result of determination is negative, the processing is finished as it is, and the routine proceeds to step 114 in the flow chart shown in FIG. 10.

Further, if the result of determination at step 206 is affirmative, the routine proceeds to step 208 where the control section 620 controls the decompression processing section 610, thereby separating the image data of high-quality images from the other image data (of characters and outlines).

At step 210, the control section 624 controls the decompression processing section 610, thereby allocating only the image data of the high-quality images to make the CTP device 702 make a press plate, whereby the image data of only high-quality images that is allocated is outputted to the CTP devices 702. Further, other image data is gathered together, and the routine proceeds to step 114 in FIG. 10.

Here, it is preferable that the processings at step 204 and step 206 be omitted and that, in a case where the electronically edited image data includes image data of high-quality images and the like, the image data of the high-quality images and the like be automatically divided among the CTP devices 702.

Further, in the selection processing of this embodiment, as for the image data including the high-quality images and the like, the image data is automatically reallocated to print the image data by the CTP device 702, but it is preferable to issue a warning and to select by hand whether or not the image data is to be printed by the CTP device 702.

Here, description will be given returning to the flow chart shown in FIG. 5.

At step 114, the job ticket (JDF) is referred to by the printing control section 620, and the routine proceeds to step 116 where it is determined whether or not an instruction of collation or an instruction of face down printing is described in the job ticket.

If the result of determination is affirmative, the routine proceeds to step 118 where the image data of each page electronically edited by the decompression processing section 610 are rearranged according to the instruction of the job ticket, and then the routine proceeds to step 120. On the other hand, if the result of determination at step 116 is negative, the routine proceeds directly to step 120.

At step 120, it is determined whether or not an instruction for double-sided printing is described in the job ticket (JDF) referred to at step 114. If the result of determination is affirmative, the routine proceeds to step 122 where the page sequence instructed by the JDF is acquired. That is, when double-sided printing is performed, the printing is performed in a print sequence different for each print engine, so that, in order to perform the double-sided printing efficiently, the image data is required to be outputted to the print engine in the order of pages according to each print engine. Hence, at step 122, the page sequence specific to each print engine when the double-sided printing is performed is acquired. Here, the page sequence is acquired from the print engine designated by the JDF On the other hand, if the result of determination at step 120 is negative, the routine proceeds to step 124 where the page sequence specific to each print engine designated by the JDF is acquired from the print engine, and the routine proceeds to step 126.

At step 126, the image forming apparatus 11 is activated to start by the control section 624, and the image data of each electronically edited page is outputted as printing data in a sequence suited for the processing characteristic (acquired page sequence) of the print engine 30 of the output side to the print engine 30 in sequence, whereby the series of processings is finished. That is, when the control section 624 activates the image forming device 11 to start, the control section 624 acquires the print sequence of the image forming device 11, rearranges the image data of each electronically edited page according to the acquired print sequence, and outputs the image data in this sequence to the print engine 30. As a result, it is possible to subject the image data to the processing according to the processing characteristics of the output side and then to transfer the image data to the outside.

In this regard, step 106, step 112 and step 118 correspond to the processings of the image processing section of the invention. Step 120 corresponds to the processing of the determination section of the invention. Step 122 and step 124 correspond to the processing of the processing characteristic acquisition section of the invention. Step 126 corresponds to the processing of the collation section of the invention. Further, the selection processing at step 113 correspond to the processing of the selection section of the invention.

Figure 12:
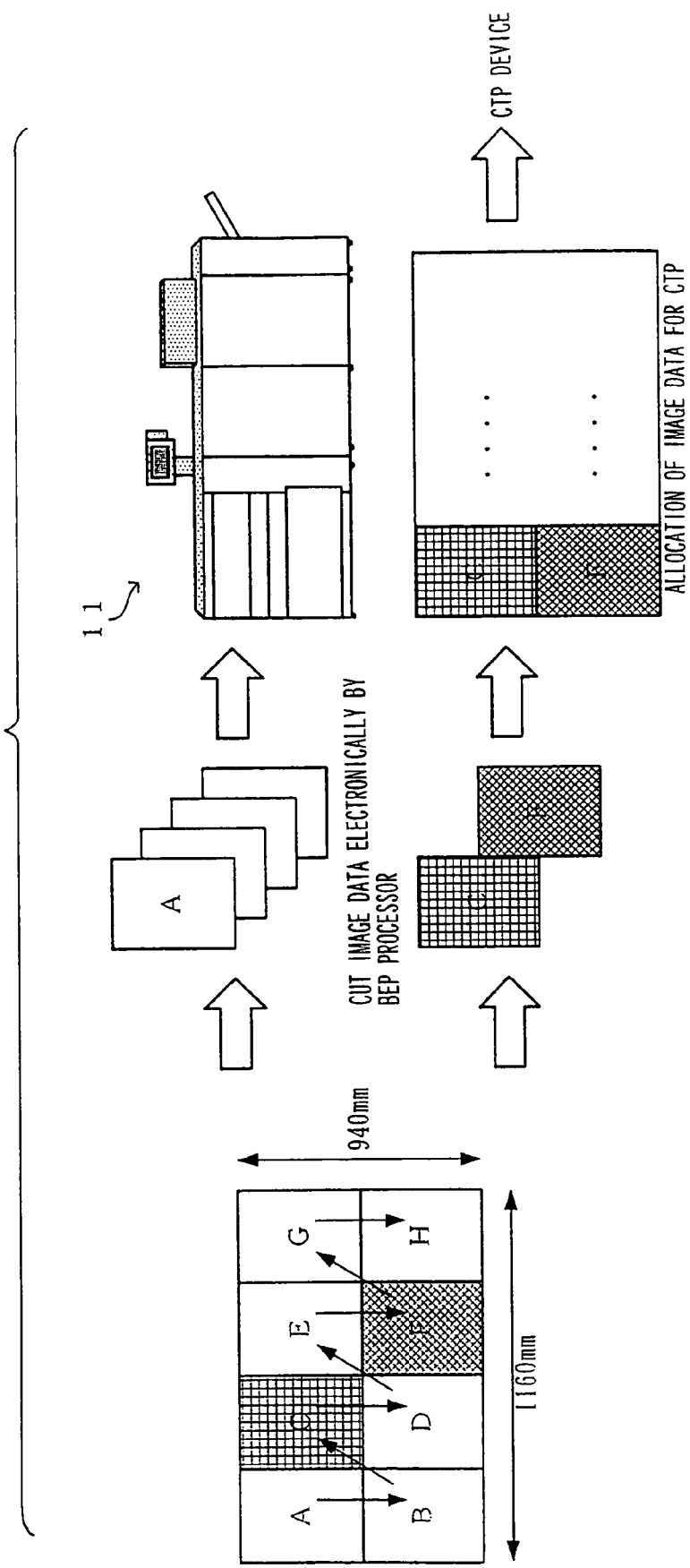
FIG. 12 is a schematic illustration to show the image of a selection processing performed by the BEP.

The BEP 600 of this embodiment performs the selection processing described in FIG. 11 and thus can use the printing by the CTP device 702 and the on-demand printing properly according to the Description in the TEFF. For example, as shown in FIG. 12, there are cases where pages including mainly characters such as A, B, D, E, G, and H and pages including high-quality gravure images such as C and F are mixed in the image data allocated like A to H in the image for the CTP method. One example is a case where a page including mainly characters such as an itinerary and pages including landscapes of travel destinations are mixed in the image data. Another example is a case where pages including the procedures of experiments and pages including images of experiment equipment are mixed in a text for a school or a cram school. In these cases, in the selection processing, the BEP 600 edits the image data electronically to separate the pages including mainly characters from the pages including images such as gravure images in consideration of the layout of allocation with reference to the tag in the TIFF. Then, the BEP 600 divides the image data in such a way that the pages including characters are printed on-demand by the image forming apparatus 11 and that the pages including gravure images are allocated for the CTP method and are printed by the CTO device 702. In this manner, the CTP method and POD can be used properly according to the image data.

According to the embodiment, the image data of a large size that is processed independently of the processing characteristic of the image forming apparatus and is allocated for a press plate is received and stored. Further, mode information related to an output mode desired by a client and image information related to the image data are acquired, and allocation information related to an allocation position is detected on the basis of the acquired mode information. That is, as for the image data subjected to the RIP for the CTP method, plural image data are allocated to be made one set of image data, so that the layout of the individual images allocated to the one set of image data can be detected by detecting the allocation information at the detection step.

Further, the image data of a large size is electronically edited/divided on the basis of the detected allocation information. That is, dividing positions are determined according to the detected layout of the individual images and the image data is electronically edited/divided. Hence, the allocated image data is electronically edited (divided) to be converted to the image data of a size that can be processed by the on-demand printing and then is transferred to the image forming apparatus, so that the image data produced for the CTP method can be used for the on-demand printing.

Further, image data to be reallocated for a press plate among the respective electronically edited image data is selected on the basis of the acquired image information, and the selected image data is transferred to a device that reallocates the selected data to produce a press plate. For example, the selection step can select image data to be reallocated for the press plate according to high-quality images and other characters and outlines. As a result, according to the quality of images, printing can be selectively performed in a proper manner such that high-quality images are printed by the CTP method and other characters and outlines are printed by on-demand printing. Hence, the image data produced for the CTP method can be allotted to the on-demand printing.

A processing of truing up the orientation of each image data after the editing may be further performed. Truing up the orientation of each image data in this manner eliminates the need for truing up the orientation of pages after printing the images and thus makes it possible to perform a postprocessing such as punching or stapling with ease.

Further, the image formation assisting method may further include controlling each internal functional section in such a way that the acquired image data is subjected to a processing depending on the image forming apparatus and the processed image data is sent to the image forming apparatus. The inclusion of the printing control in this manner makes it possible to perform printing control according to the image forming apparatus at the output side.

Still further, the image formation assisting method may further include: determining whether or not the image data is to be used for double-sided recording, on the basis of the received mode information; acquiring a processing characteristic of the image forming apparatus; and rearranging the electronically edited image data on the basis of a determination result of the determining and the acquired processing characteristic of the image forming apparatus. Hence, the respective image data can be rearranged in consideration of recording the image data on the top and bottom of the printing paper and in the order according to the processing characteristic depending on the image forming apparatus. As a result, even the image data of a large size that is produced for the CTP method and includes image data to be recorded on the top and bottom of the printing paper can be used for the on-demand printing. Up to this point, the invention has been described by using embodiments, but the technical scope of the invention is not limited to the scope described in the above embodiments. A wide variety of modifications and improvements can be added to the above embodiments without departing from the spirit and scope of the invention, and the embodiments having those modifications and improvements added thereto are included within the technical scope of the invention.

Further, the above embodiments do not limit the invention as defined by the appended claims, and all combinations of features described in the above embodiments are not necessarily essential for means for resolution of the invention. The invention at various steps is included in the above embodiments, and variations of the invention can be extracted from the appropriate combinations of plural constituent features disclosed herein. Even if some constituent features are eliminated from all of the constituent features disclosed in the embodiments, the configuration from which these some constituent features are eliminated can be extracted as the invention as far as the configuration can produce the effect.

Still further, as for the processings of compression and decompression, appropriate processings can also be used according to the characteristics of image objects, for example, image objects expressed mainly by binary values such as outlines and characters (line image/character object LW (Line Work) and image objects expressed mainly with a continuous tone such as background and photographs (continuous-tone image object CT (Continuous Tone)).

What is claimed is:

1. An image formation assisting device that processes a printing job to produce image data of respective pages and transfers a processed image data to an image forming apparatus, the image data being dependent on a configuration of the image forming apparatus, the device comprising:
   a memory that stores the image data of a large size that is processed independently of a processing characteristic of the image forming apparatus and is allocated for a press plate;
   an output mode information acquisition section that receives information related to an output mode desired by a client;
   a detection section that detects allocation information related to an allocation position on the basis of the information related to the output mode acquired by the output mode information acquisition section;
   an image processor that electronically edits the image data of a large size so as to be divided into appropriate sizes on the basis of the allocation information detected by the detection section; and
   a printing control section for controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

2. An image formation assisting device according to claim 1, wherein the image processor further performs a process of truing up an orientation of each portion of divided image data after editing the image data.

3. An image formation assisting device according to claim 1, further comprising a printing controller that controls each internal functional section in such a way that the image data acquired by the image processor is subjected to processing depending on the image forming apparatus and the processed image data is sent to the image forming apparatus.

4. An image formation assisting method of processing a printing job to produce image data of respective pages and transferring a processed image data to an image forming apparatus, the image data being dependent on a configuration of the image forming apparatus, the method comprising:
   storing the image data of a large size that is processed independently of a processing characteristic of the image forming apparatus and is allocated for a press plate;
   receiving information related to an output mode desired by a client;
   detecting allocation information related to an allocation position on the basis of the information related to the output mode acquired at the received output mode;
   electronically editing the image data of a large size so as to be divided into appropriate sizes on the basis of the detected allocation information; and
   controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

5. An image formation assisting method according to claim 4, wherein the method further comprises truing up an orientation of each portion of image data after the editing.

6. An image formation assisting method according to claim 4, further comprising controlling each internal functional section in such a way that the image data acquired at the editing is subjected to processing depending on the image forming apparatus and the processed image data is sent to the image forming apparatus.

7. An image formation assisting system comprising:
(A) an image producing device that processes a printing job to produce image data of respective pages and outputs the image data to an image formation assisting device;
(B) the image formation assisting device that processes the image data of the respective pages and transfers the processed image data to an image forming apparatus, the image data being dependent on a configuration of the image forming apparatus, the image formation assisting device including:
  (i) a memory that stores the image data of a large size that is processed independently of a processing characteristic of the image forming apparatus and is allocated for a press plate;
  (ii) an output mode information acquisition section that receives information related to an output mode desired by a client;
  (iii) a detection section that detects allocation information related to an allocation position on the basis of the information related to the output mode acquired by the output mode information acquisition section; and
  (iv) an image processor that electronically edits the image data of a large size so as to be divided into appropriate sizes on the basis of the allocation information detected by the detection section;
(C) a printing control section for controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

8. An image formation assisting device that processes a printing job to produce image data of respective pages and transfers a processed image data to an image forming apparatus, the image data being dependent on a configuration of the image forming apparatus, the device comprising:
a memory that stores the image data of a large size that is processed independently of a processing characteristic of the image forming apparatus and is allocated for a press plate;
an output mode information acquisition section that receives information related to an output mode desired by a client;
a detection section that detects allocation information related to an allocation position on the basis of the information related to the output mode acquired by the output mode information acquisition section;
an image processor that electronically edits the image data of a large size so as to be divided into appropriate sizes on the basis of the allocation information detected by the detection section;
a determination section that determines whether or not the image data is to be used for double-sided recording, on the basis of information related to the output mode acquired by the output mode information acquisition section;
a processing characteristic acquisition section that acquires a processing characteristic of the image forming apparatus;
a collation section that rearranges the image data, electronically edited by the image processing section, on the basis of a determination result of the determination section and the processing characteristic of the image forming apparatus acquired by the processing characteristic acquisition section; and
a printing control section for controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

9. An image formation assisting device according to claim 8, wherein the image processor further performs a process of truing up an orientation of each portion of the divided image data after editing the image data.

10. An image formation assisting method of processing a printing job to produce image data of respective pages and transferring a processed image data to an image forming apparatus, the image data being dependent on a configuration of the image forming apparatus, the method comprising:
storing the image data of a large size that is processed independently of a processing characteristic of the image forming apparatus and is allocated for a press plate;
receiving information related to an output mode desired by a client;
detecting allocation information related to an allocation position on the basis of the information related to the received output mode;
electronically editing the image data of a large size so as to be divided into appropriate sizes on the basis of the detected allocation information;
determining whether or not the image data is to be used for double-sided recording, on the basis of information related to the received output mode;
acquiring a processing characteristic of the image forming apparatus;
rearranging the edited image data, on the basis of a determination result of the determining and the acquired processing characteristic of the image forming apparatus; and
controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

11. An image formation assisting method according to claim 10, wherein the image processing step further performs a process of truing up an orientation of each portion of the divided image data.

12. An image formation assisting system comprising:
(A) an image producing device that processes a printing job to produce image data of respective pages and outputs the image data to an image formation assisting device;
(B) the image formation assisting device that processes the image data of respective pages and transfers the processed image data to an image forming apparatus, the image data being dependent on a configuration of the image forming apparatus, the image formation assisting device including:

(i) a memory that stores the image data of a large size that is processed independently of a processing characteristic of the image forming apparatus and is allocated for a press plate;

(ii) an output mode information acquisition section that receives information related to an output mode desired by a client;

(iii) a detection section that detects allocation information related to an allocation position on the basis of the information related to the output mode acquired by the output mode information acquisition section;

(iv) an image processor that electronically edits the image data of a large size so as to be divided into appropriate sizes on the basis of the allocation information detected by the detection section;

(v) a determination section that determines whether or not the image data is to be used for double-sided recording, on the basis of information related to the output mode acquired by the output mode information acquisition section;

(vi) a processing characteristic acquisition section that acquires a processing characteristic of the image forming apparatus; and (vii) a collation section that rearranges the image data, electronically edited by the image processing section, on the basis of a determination result of the determination section and the processing characteristic of the image forming apparatus acquired by the processing characteristic acquisition section;

(C) a printing control section for controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

13. An image formation assisting device that processes a printing job to produce image data of respective pages and transfers a processed image data to an image forming apparatus, the image data being dependent on a configuration of the image forming apparatus, the device comprising:

a memory that stores the image data of a large size that is processed independently of a processing characteristic of the image forming apparatus and is allocated for a press plate;

an output mode information acquisition section that receives mode information related to an output mode desired by a client and image information related to the image data;

a detection section that detects allocation information related to an allocation position on the basis of the mode information acquired by the output mode information acquisition section;

an image processor that electronically edits the image data of a large size so as to be divided into appropriate sizes on the basis of the allocation information detected by the detection section;

a selection section that selects image data to be reallocated for a press plate from among the image data electronically edited by the image processor, on the basis of the image information acquired by the output mode information acquisition section, and transfers the selected image data to a device that reallocates the selected image data to produce a press plate; and a printing control section for controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

14. An image formation assisting device according to claim 13, wherein the image processor further performs a processing of truing up an orientation of each portion of the divided image data after the editing.

15. An image formation assisting device according to claim 13, further comprising a printing controller that controls each internal functional section in such a way that the image data acquired by the image processor is subjected to processing depending on the image forming apparatus and the processed image data is sent to the image forming apparatus.

16. An image formation assisting device according to claim 13, further comprising:

a determination section that determines whether or not the image data is to be used for double-sided recording, on the basis of information related to the output mode acquired by the output mode information acquisition section;

a processing characteristic acquisition section that acquires a processing characteristic of the image forming apparatus; and a collation section that rearranges the image data, electronically edited by the image processing section, on the basis of a determination result of the determination section and the processing characteristic of the image forming apparatus acquired by the processing characteristic acquisition section.

17. An image formation assisting method of processing a printing job to produce image data of respective pages and transferring a processed image data to an image forming apparatus, the image data being dependent on a configuration of the image forming apparatus, the method comprising:

storing the image data of a large size that is processed independently of a processing characteristic of the image forming apparatus and is allocated for a press plate;

receiving mode information related to an output mode desired by a client and image information related to the image data;

detecting allocation information related to an allocation position on the basis of the received mode information;

electronically editing the image data of a large size so as to be divided into appropriate sizes on the basis of the detected allocation information;

selecting image data to be reallocated for a press plate from among the respective electronically edited image data on the basis of the image information and transferring the selected image data to a device that reallocates the selected image data to produce a press plate; and controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

18. An image formation assisting method according to claim 17, wherein the method further comprises truing up an orientation of each portion of the divided image data after the editing.

19. An image formation assisting method according to claim 17, further comprising a printing control step of controlling each internal functional section in such a way that the image data acquired at the editing is subjected to processing depending on the image forming apparatus and the processed image data is sent to the image forming apparatus.

20. An image formation assisting method according to claim 17, further comprising:
- determining whether or not the image data is to be used for double-sided recording, on the basis of the received mode information;
- acquiring a processing characteristic of the image forming apparatus; and
- rearranging the electronically edited image data on the basis of a determination result of the determining and the acquired processing characteristic of the image forming apparatus.

21. An image formation assisting system comprising:
(A) an image producing device that processes a printing job to produce image data of respective pages and outputs the image data to an image formation assisting device;
(B) the image formation assisting device that processes the image data of respective pages and transfers the processed image data to an image forming apparatus, the image data being dependent on a configuration of the image forming apparatus, the device including:
 (i) a memory that stores the image data of a large size that is processed independently of a processing characteristic of the image forming apparatus and is allocated for a press plate;
 (ii) an output mode information acquisition section that receives mode information related to an output mode desired by a client and image information related to the image data;
 (iii) a detection section that detects allocation information related to an allocation position on the basis of the information acquired by the output mode information acquisition section;
 (iv) an image processor that electronically edits the image data of a large size so as to be divided into appropriate sizes on the basis of the allocation information detected by the detection section; and
 (v) a selection section that selects image data to be reallocated for a press plate from among the image data electronically edited by the image processor, on the basis of the image information acquired by the output mode information acquisition section, and transfers the selected image data to a device that reallocates the selected image data to produce a press plate;
(C) a printing control section for controlling an image processing section in such a way that a print sequence information on an image forming order depending from the image forming apparatus is acquired from the image forming apparatus, and the image data acquired by the image processing section is subjected to rearranging according to the print sequence, and the rearranged image data is sent to the image forming apparatus.

* * * * *